US011358153B2

(12) United States Patent
So et al.

(10) Patent No.: US 11,358,153 B2
(45) Date of Patent: Jun. 14, 2022

(54) ELECTRIC DUST COLLECTING DEVICE AND HUMIDIFYING AIR CONDITIONER INCLUDING THE SAME

(71) Applicant: SAMSUNG ELECTRONICS CO., LTD., Suwon-si (KR)

(72) Inventors: Sang-young So, Seongnam-si (KR); Kyu-ho Shin, Seoul (KR); Young-min Cheong, Seoul (KR); Jae-youl Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 430 days.

(21) Appl. No.: 16/461,706

(22) PCT Filed: Mar. 7, 2017

(86) PCT No.: PCT/KR2017/002476
§ 371 (c)(1),
(2) Date: May 16, 2019

(87) PCT Pub. No.: WO2018/105819
PCT Pub. Date: Jun. 14, 2018

(65) Prior Publication Data
US 2019/0358647 A1 Nov. 28, 2019

(30) Foreign Application Priority Data
Dec. 9, 2016 (KR) ........................ 10-2016-0167326

(51) Int. Cl.
*B03C 3/14* (2006.01)
*B03C 3/16* (2006.01)
(Continued)

(52) U.S. Cl.
CPC .............. *B03C 3/014* (2013.01); *B01D 47/06* (2013.01); *B03C 3/16* (2013.01); *B03C 3/41* (2013.01); *B03C 2201/04* (2013.01)

(58) Field of Classification Search
CPC combination set(s) only.
See application file for complete search history.

(56) References Cited

U.S. PATENT DOCUMENTS 5,902,380 A * 5/1999 Tomimatsu .......... B01D 53/504 96/27
6,471,753 B1 * 10/2002 Ahn .......................... B03C 3/16 95/71
7,621,984 B2 * 11/2009 Cowie ....................... B03C 3/08 96/41
7,875,104 B2 * 1/2011 Cowie ....................... B03C 3/32 96/39
(Continued)

FOREIGN PATENT DOCUMENTS

CN 105152254 12/2015
EP 1095705 5/2001
(Continued)

OTHER PUBLICATIONS

International Search Report dated Sep. 7, 2017 in corresponding International Application No. PCT/KR2017/002476.
(Continued)

*Primary Examiner* — Christopher P Jones
*Assistant Examiner* — Sonji Turner
(74) *Attorney, Agent, or Firm* — Staas & Halsey LLP

(57) ABSTRACT

An electric dust collecting device is provided. The electric dust collecting device according to an embodiment includes a mixing part into which outside air flows, an electrostatic sprayer configured to spray droplets charged to the mixing part to be combined with contaminants contained in outside air, a dust collecting part configured to form an electric field
(Continued)

and adsorb droplets combined with contaminants, and a draining part combined with the dust collection part to discharge the droplets adsorbed in the dust collecting part.

12 Claims, 21 Drawing Sheets

(51) Int. Cl.

| | |
|---|---|
| ***B03C 3/41*** | (2006.01) |
| ***B01D 47/06*** | (2006.01) |
| ***B03C 3/014*** | (2006.01) |

(56) References Cited

U.S. PATENT DOCUMENTS

| | | | | |
|---|---|---|---|---|
| 8,597,415 | B2 | 12/2013 | Noh et al. | |
| 9,346,060 | B2 | 5/2016 | Zhou | |
| 9,625,167 | B2 | 4/2017 | Choi et al. | |
| 2009/0263293 | A1* | 10/2009 | Motegi ..................... | B03C 3/16 422/122 |
| 2010/0313761 | A1* | 12/2010 | Tanaka .................... | B03C 3/368 96/52 |

FOREIGN PATENT DOCUMENTS

| | | |
|---|---|---|
| EP | 2700451 | 2/2014 |
| JP | 9-57054 | 3/1997 |
| JP | 2009-39545 | 2/2009 |
| JP | 4326403 | 6/2009 |
| JP | 2011-99647 | 5/2011 |
| KR | 10-2009-0005218 | 1/2009 |
| KR | 10-2011-0045851 | 5/2011 |
| KR | 10-2011-0094809 | 8/2011 |
| KR | 10-2013-0104184 | 9/2013 |
| KR | 10-1474493 | 12/2014 |

OTHER PUBLICATIONS

Written Opinion dated Sep. 7, 2017 in corresponding International Application No. PCT/KR2017/002476.

Chinese Office Action dated Feb. 25, 2020 in Chinese Patent Application No. 201780074432.9.

Extended European Search Report dated Oct. 2, 2019 in European Patent Application No. 17878446.8.

* cited by examiner

ELECTRIC DUST COLLECTING DEVICE AND HUMIDIFYING AIR CONDITIONER INCLUDING THE SAME

CROSS-REFERENCE TO RELATED APPLICATIONS

This application is a National Phase Application under 35 U.S.C. § 371, of International Application No. PCT/KR2017/002476, filed Mar. 7, 2017, which claims priority to Korean Patent Application No. 10-2016-0167326, filed Dec. 9, 2016, the entire disclosures of which are herein incorporated by reference as part of this application.

BACKGROUND

1. Field of the Invention

Devices and methods consistent with what is disclosed herein relate to an electric dust collecting device including the improved dust collecting function and ease of management and a humidifying air conditioner including the same.

2. Description of the Related Art

A humidifier and an air conditioner for managing indoor air have been widely used.

A humidifier raises or maintains the humidity of indoor air by spraying water into water droplets or water vapor, and an air conditioner inhales the contaminated indoor air, filters contaminants such as dust, odor particles, etc. contained in the air, and then discharges the filtered air into the indoor space to purify indoor air.

Recently, a device capable of both humidifying and air conditioning with a humidifier and an air conditioner combined as one, i.e. a humidifying air conditioner has been used.

A conventional humidifier, air conditioner, and humidifying air conditioner purify contaminants using a filer. Therefore, the filter needs to be replaced or cleansed on a regular basis.

However, when if such maintenance is not performed in time, air passing through the filer containing the contaminants is discharged into the indoor space, and thus the quality of indoor air could be deteriorated.

SUMMARY

An aspect of the exemplary embodiments relates to providing an electric dust collecting device including the improved dust collecting function and ease of management and a humidifying air conditioner including the same.

According to an exemplary embodiment, there is provided an electric dust collecting device including a mixing part into which outside air flows, an electrostatic sprayer configured to spray droplets charged to the mixing part to be combined with contaminants contained in outside air, a dust collecting part configured to form an electric field and adsorb droplets combined with contaminants, and a draining part combined with the dust collection part to discharge the droplets adsorbed in the dust collecting part.

The dust collecting part may include a charging part, and an absorption part oppositely combined with the charging part, and configured to absorb droplets passing through the charging part.

The charging part may include a plurality of charge wires disposed along a length direction of the charging part to allow power to be applied to an upper end of the charge wires, and disposed in parallel to each other along a width direction of the charging part, and a plurality of ground plates disposed between the plurality of charge wires.

The draining part may include a plurality of condensation units combined with lower end parts of the plurality of ground plates.

The charging part may include a charging part cover for covering the plurality of charge wires and the plurality of ground plates, wherein the charging part cover includes a plurality of draining holes formed to face the plurality of condensation units.

The condensation units may include insert grooves into which the lower end parts of the ground plates are inserted, and inclination parts for covering part of both side surfaces of ground plates.

The inclination parts may be inclined downwardly toward the draining holes.

The draining part may include a first draining guide unit disposed under at least one of the upper end parts or the lower end parts of the plurality of ground plates, and extending along a width direction of the charging part.

The first draining guide may include a bottom surface part extending along the width direction of the charging part and side wall parts disposed on both sides of the bottom surface part.

The draining part may include a second draining guide unit disposed under a lower end part of the plurality of charge wires, and extending along a width direction of the charging part.

The second draining guide unit may include a draining guide part protruding outwardly from the lower end part of the charging part and inclined toward a bottom surface of the mixing part.

The charging part may include a plurality of winding parts disposed on the lower end part of the charging part, and around which each of the plurality of charge wires are wound, wherein the plurality of winding parts are combined on the second draining guide unit.

The winding part may further include a draining hole disposed under a lower end part of the winding part, and opened toward the draining guide part.

The winding part may include a plurality of winding support parts protruding from a side surface and supporting wound charge wires, and the plurality of winding support parts are disposed at an interval between 10 mm to 15 mm from a lower end part of the winding part.

The draining part may include a third draining guide unit disposed between the upper end part of the plurality of charge wires and the charging part cover, extending along the width direction of the charging part, and having both ends protruding to an outer side of the charging part cover.

The third draining guide unit may include a bottom surface part extending along the width direction of the charging part and side wall parts disposed on both sides of the bottom surface part, and a side wall part disposed close to the lower end part of the charging part of the side wall parts disposed on the both sides of the bottom surface part may include a plurality of wire grooves into which the plurality of charge wires are inserted.

The charging part may include a first connection plate for connecting upper end parts of the plurality of ground plates, a second connection plate for connecting lower end parts of the plurality of ground plates, and first and second insulation plates disposed under the first and second connection plates, and insulating between the first and second connection plates and the charging part cover.

The first and second connection plates and the plurality of ground plates may be disposed to be perpendicular to each other, and the first and second insulation plates each includes ground grooves into which upper end parts and lower end parts of the ground plates are inserted.

The absorption part may include a plurality of charge plates disposed along a length direction of the absorption part to allow power to be applied, disposed in parallel to each other along a width direction of the absorption part, and a plurality of ground plates disposed between the plurality of charge plates.

At least one of the plurality of charge plates and the plurality of ground plates may further include a super hydrophilic coating layer.

An absorption part cover for covering the plurality of charge plates and the plurality of ground plates may be further included, and the absorption part cover may include a first absorption part cover opposite to the charging part, and a second absorption part cover combined with the first absorption part cover.

The second absorption cover may include a plurality of draining holes formed under a lower end part of the second absorption part cover.

The electrostatic sprayer may include an accommodation part configured to store water, a first electrode part configured to apply a voltage to the accommodation part, a nozzle part combined with the accommodation part and configured to spray droplets to the mixing part, and a second electronic part disposed between the nozzle part and the mixing part and to which an electrode opposite to an electrode of the first electrode is applied.

The nozzle part may include a nozzle plate combined with the accommodation part, and including an opening, and a nozzle film combined with the nozzle plate, and including a plurality of spraying holes.

The second electrode part may include a frame in a ring shape including an opening in a shape corresponding to an arrangement of the plurality of spraying holes, and a plurality of second electrode wires disposed to cross the opening of the frame.

The nozzle part may further include a nozzle bracket for supporting the nozzle plate, and the second electrode part may include a plurality of connection members for connecting the frame to the nozzle bracket.

A diameter of the spraying hole may be between 25 μm to 50 μm.

The electric dust collecting device may further include a water storage for collecting droplets dropping from the draining part.

The dust collecting part may be disposed to be inclines with respect to a horizontal plane.

According to an exemplary embodiment, there is provided a humidifier air conditioner including a mixing part into which outside air flows, an electrostatic sprayer configured to spray droplets charged to the mixing part to be combined with contaminants contained in outside air, and a dust collecting part configured to form an electric filed and absorb droplets combined with contaminants, a draining part combined with the dust collecting part and discharging droplets absorbed to the dust collecting part, a water storage configured to collect droplets dropping from the draining part by gravity, and a draining part configured to discharge air passing through the dust collecting part.

DETAILED DESCRIPTION OF EXEMPLARY EMBODIMENTS

Figure 1:
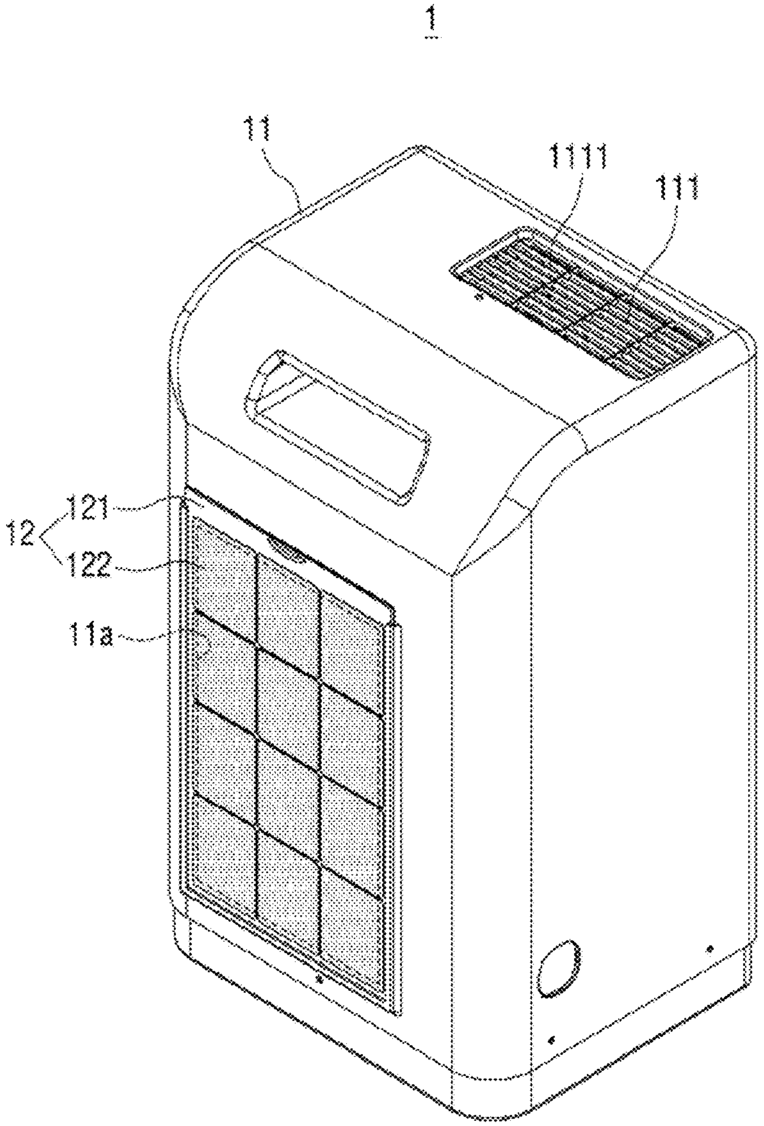
FIG. 1 is a perspective view illustrating the outside of an electric dust collecting device according to an embodiment.

Hereinafter, embodiments of the disclosure will be described in detail with reference to the accompanying drawings. The embodiments described below will be described on the basis of embodiments most suitable to understand the technical features of the disclosure and the technical features of the disclosure are not limited by the described embodiments, and the disclosure may be implemented with embodiments.

Therefore, it is intended that the present disclosure covers the modifications and variations of this invention provided they come within the scope of the appended claims and their equivalents. In order to facilitate understanding of the embodiments to be described below, in the reference numerals shown in the accompanying drawings, among the components having the same function in each embodiment, the related components are denoted by the same or an extension line number.

FIG. 1 is a perspective view illustrating the outside of an electric dust collecting device 1 according to an embodiment.

According to an embodiment, an electric dust collecting device 1 may be a humidifier, an air conditioner, and a humidifying air conditioner configured to inhale outside air of the electric dust collecting device 1, filer contaminants such as dust, odor particles, etc. contained in the air, and discharges the purified air. However, for ease of explanation, the above will be referred to as the electric dust collecting device 1.

Referring to FIG. 1, the electric dust collecting device 1 may include a case 11 forming the outside thereof and an external filter 12 combined with the case 11.

The case 11 may be an approximate cube shape, and outside air of the case 11 may flow into the inside of the case 11 through an intake port 11*a* formed on the front surface of the case 11.

Contaminants of the air flowing into the inside of the electric dust collecting device 1 through the intake port 11*a* of the case 11 may be removed in the electric duct collecting device 1, and the purified air may be discharged through an exhaust hole 111 provide on the upper surface of the case 11.

The exhaust hole 111 may have a grill structure including a plurality of wings 1111 arranged therein, and could be arranged on the side surface, the rear surface and the front surface as well as the upper surface of the case 11.

Referring to FIG. 1, the external filter 12 covering the intake port 11*a* may be arranged on the intake port 11*a* of the case 11.

The external filter 12 may include a filter tray 121 including a plurality of openings and a plurality of filters 122 covering each opening of the filter tray 121.

The plurality of filters 122 may include a plurality of holes, and the air outside the electric dust collecting device 1 may pass through the plurality of filters 122 to flow into the inside of the electric dust collecting device 1 through the intake port 11*a*. The contaminants such as dust contained in the air outside the electric dust collecting device 1 may be filtered through the external filter 12 to flow into the inside of the electric dust collecting device 1.

The external filter 12 may be detachably combined on the position corresponding to the intake port 11*a* on the case 11, and when contaminants are accumulated in the external filter 12, the external filter 12 may be separated from the case 11 to be cleaned or changed.

The external filter 12 may be slidably combined with the case 11 to open and close the intake port 11*a* of the case 11, so that the external filter 12 may be easily combined with or separated from the case 11.

In addition, a display (not shown) for displaying operational information of the electric dust collecting device 1 and an inputter (not shown) for receiving an operational command from a user may be disposed on the case 11.

The case 11 may be configured to be opened through its one side or one part such that a water storage (14 of FIG. 2) of the electric dust collecting device 1 may be separated from the inside of the electric dust collecting device 1. Thus, a user may easily remove the water stored in the water storage 14, or fill up water to be supplied to the electrostatic sprayer (20 of FIG. 2).

Figure 2:
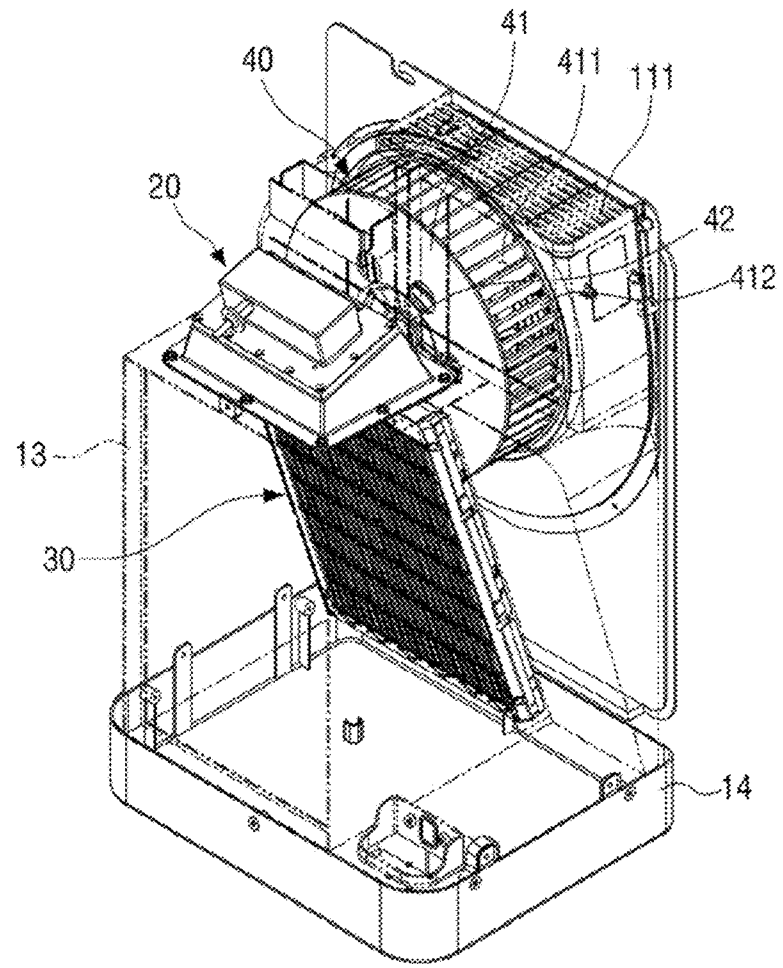
FIG. 2 is a perspective view illustrating the inside of an electric dust collecting device of FIG. 1.
Figure 3:
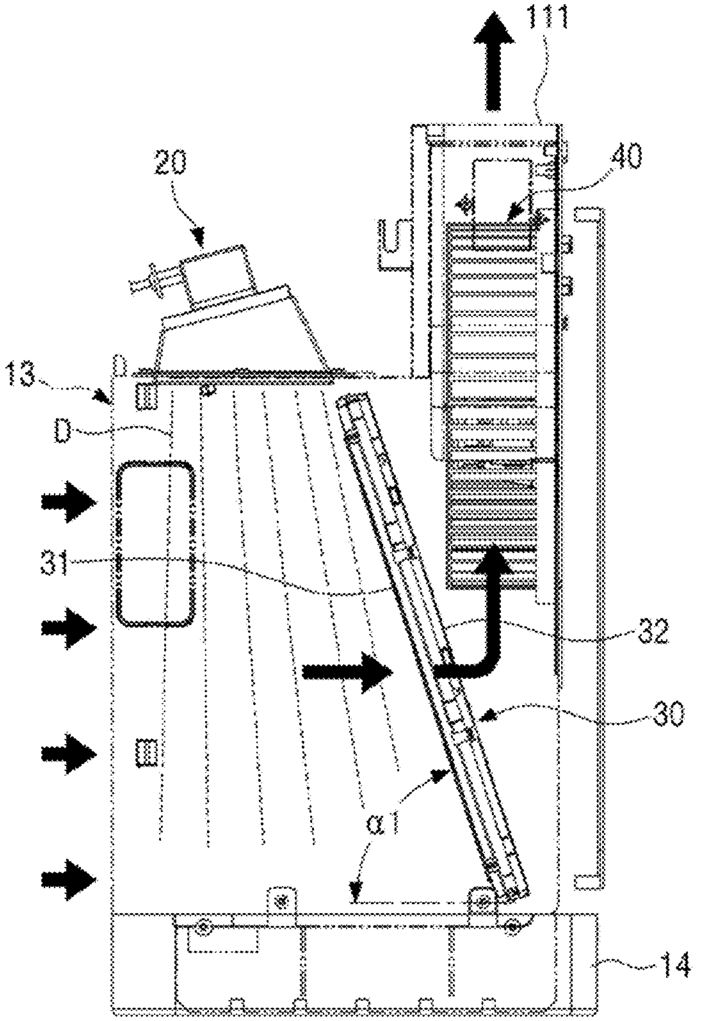
FIG. 3 is a side view illustrating an electric dust collecting device of FIG. 2.

FIG. 2 is a perspective view illustrating the inside of an electric dust collecting device 1 of FIG. 1, and FIG. 3 is a side view illustrating the electric dust collecting device 1 of FIG. 2.

Figure 11:
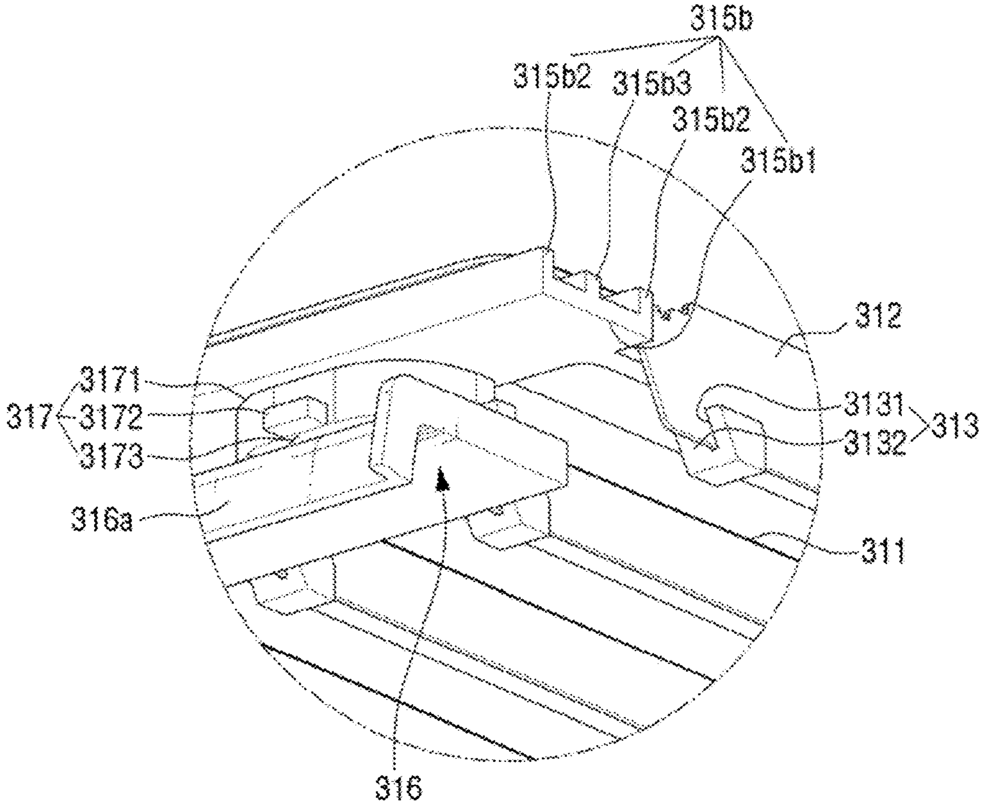
FIG. 11 is an enlarged perspective view illustrating part of a charging part of FIG. 9 viewed from another angle.

For ease of explanation, FIG. 2 and FIG. 3 illustrate internal constituent elements of the electric dust collecting device 1 without the case 11 of FIG. 11, and illustrate a mixing part 13 in which contaminants of outside air is condensed in charged droplets (D) as being transparent.

Referring to FIG. 2 and FIG. 3, the electric dust collecting device 1 may include a mixing part 13, a water storage 14, an electrostatic sprayer 20, a dust collecting part 30 and a discharging part 40.

The mixing part 13, the water storage 14, the electrostatic sprayer 20, the dust collecting part 30, and the discharging part 40 may be disposed inside the case 11.

The mixing part 13 may be a duct including a flow path therein, and outside air may flow into the mixing part 3 because the mixing part is connected to the intake port 11*a* of the case 11. The mixing part 13 may include a flow path in which air flowing into the inside passes through the dust collecting part 30 and is discharged to the outside through the exhaust hole 111.

The mixing part 13 may include one end connected to the intake port 11*a* of the case 11, and the other end, which opposite to one end, connected to the exhaust hole 111 of the case 11. The mixing part 13 may be integrally formed with the case 11.

The electrostatic sprayer 20 and the dust collecting part 30 may be combined with the mixing part 13. The contaminated air may be purified in the mixing part 13, and then discharged to the exhaust hole 111 through the dust collecting part 30.

The electrostatic sprayer 20 may be disposed on the upper end of the mixing part 13 to spray the charged droplets D to the mixing part 13. The electrostatic sprayer 20 may collect contaminants included in the outside air, which flows into the mixing part 13 to the droplets D.

The charged droplets D may have polarity, so that micro dust included in the air may be easily collected in the droplets D. In addition, the droplets D charged on the mixing part 13 may be combined with the contaminants so that the size there of may increase.

The dust collecting part 30 may be disposed downstream of the mixing part 13, may form an electric field to absorb the droplets D combined with the contaminants.

The dust collecting part 30 may include a charging part 31 and an absorption part 32 oppositely combined with the charging part 31 to absorb the droplets D passing through the charging part 31.

The dust collecting part 30 may charge the droplets D combined with the contaminants through corona discharging of the charging part 31, the charged droplets D may be absorbed in the absorption part 32, and the droplets in which the contaminants absorbed in the absorption part 32 is condensed may be in the form of water drop.

The electric dust collecting device 1 may include a draining part (300 of FIG. 6) to discharge the droplets D condensed in the dust collecting part 30 to the outside, and the draining part 300 may be combined with the dust collecting part 30 to discharge the droplets D absorbed in the dust collecting part 30 to the outside of the dust collecting part 30.

The droplets D discharged to the outside of the dust collecting part 30 through the draining part 300 may flow down or may drop down to the water storage 14 disposed under the dust collecting part 30 to be stored in the water storage 14.

To be specific, referring to FIG. 3, the dust collecting part 30 may be disposed to be inclined at a predetermined angle $\alpha 1$ based on a horizontal surface, and the angle ($\alpha 1$) may be an acute angle.

The droplets D condensed in the dust collecting part 30 may flow down or drop down to the lower end of the dust collecting part 30 by gravity to be stored in the water storage 14. In addition, the dust collecting part 30 may be disposed at a right angle with respect to a horizontal plane.

The detailed configurations of the electrostatic sprayer 20, the dust collecting part 30 and the draining part 300 will be described below.

The water storage 14 may be disposed under the mixing part 13 and the dust collecting part 30 to store the droplets D condensed in the mixing part 13 and the dust collecting part 30 to flow down.

As described above, the water storage 14 may be detachably combined with the lower end of the case 11. Therefore, when removing the contaminated droplets D collected in the water storage 14, the water storage 14 may be simply separated from the case 11 to discharge the contaminated droplets D.

The discharging part 40 may be closely disposed to the exhaust hole 111 to discharge air passing through the dust collecting part 30 to the outside through the exhaust hole 111. The discharging part 40 may be disposed downstream of the dust collecting part 30 based on a flow path formed in the electric dust collecting device 1.

As the discharging part 40 operates, the inside of the mixing part 13 may have a lower pressure than the outside of the electric dust collecting device 1 (atmospheric pressure). Therefore, the outside air near the electric dust collecting device 1 may flow into the mixing part 13 through the intake port 11*a* of the case 11. The discharging part 40 may discharge air passing through the dust collecting part 30 to the outside of the electric duct collecting device 1, and inhale the outside air into the mixing part 13.

Referring to FIG. 2 and FIG. 3, the discharging part 40 may include a discharge case 41 and a discharge motor 42 disposed in the discharge case 41.

A fan (not shown) may be combined with the discharge motor 42, and the fan may receive a driving force from the discharge motor 42 to rotate, so that the air passing through the dust collecting part 30 may be discharged to the outside through the exhaust hole 111.

A fan may be a sirocco fan with low noise, but is not limited thereto. Various types of fans could be used if a fan can discharge air passing through the dust collecting part 30 to the outside.

The discharge motor 42 and the fan may be disposed in the discharge case 41. The discharge case 41 may include an opening 411 in which air passing the dust collecting part 30 flows through, and the introduced air is discharged to the outside. The opening 411 of the discharge case 41 may be formed on a side surface of the discharge case 41 in a cylinder shape, and connected to a flow path disposed downstream of the dust collecting part 30 in the electric duct collecting device 1 and the exhaust hole 111.

Referring to FIG. 3, air passing through the dust collecting part 30 may flow into the opening 411 under the discharge case 41, and the air flowing into the discharge case 41 may pass through the opening 411 on the discharge case 41 to be discharged to the exhaust hole 111.

The discharge case 41 may include a guide wing 412 for guiding air passing through the dust collecting part 30 into the inside of the discharge case 41, and guiding the air flow from the inside of the discharge case 41 to the exhaust hole 111.

The guide wing 412 may include a plurality of guide wings, and the plurality of guide wings 412 may be disposed on the opening 411 of the discharge case 41.

The configuration of the discharging part 40 may be formed in different structures in which air flowing into the inside of the electric dust collecting device 1 is discharged into the outside. This is the same as or similar to a conventional technique. Therefore, the detailed description thereof will be omitted.

Figure 4:
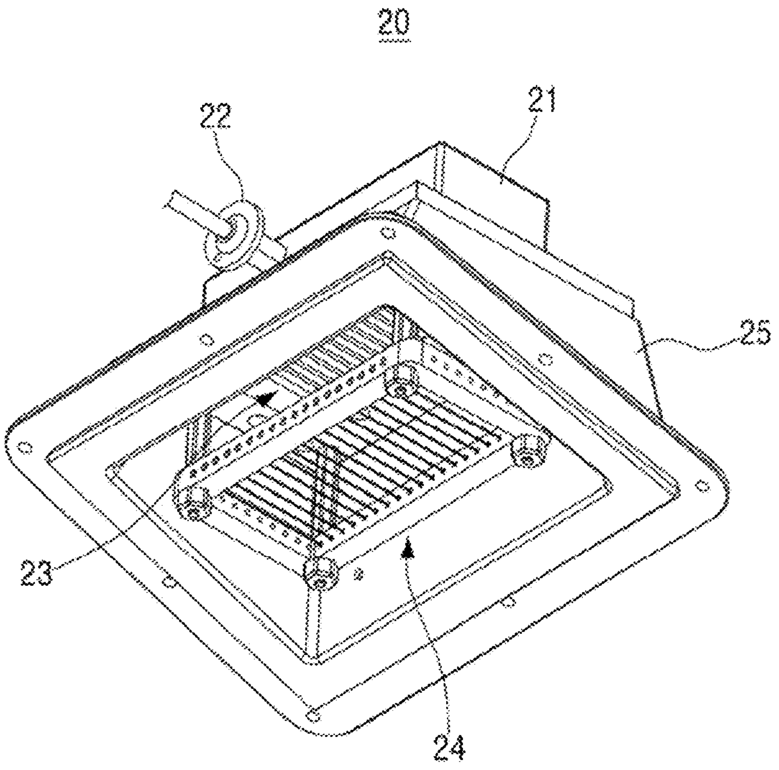
FIG. 4 is a perspective view illustrating an electrostatic sprayer of FIG. 3 viewed from another angle.
Figure 5:
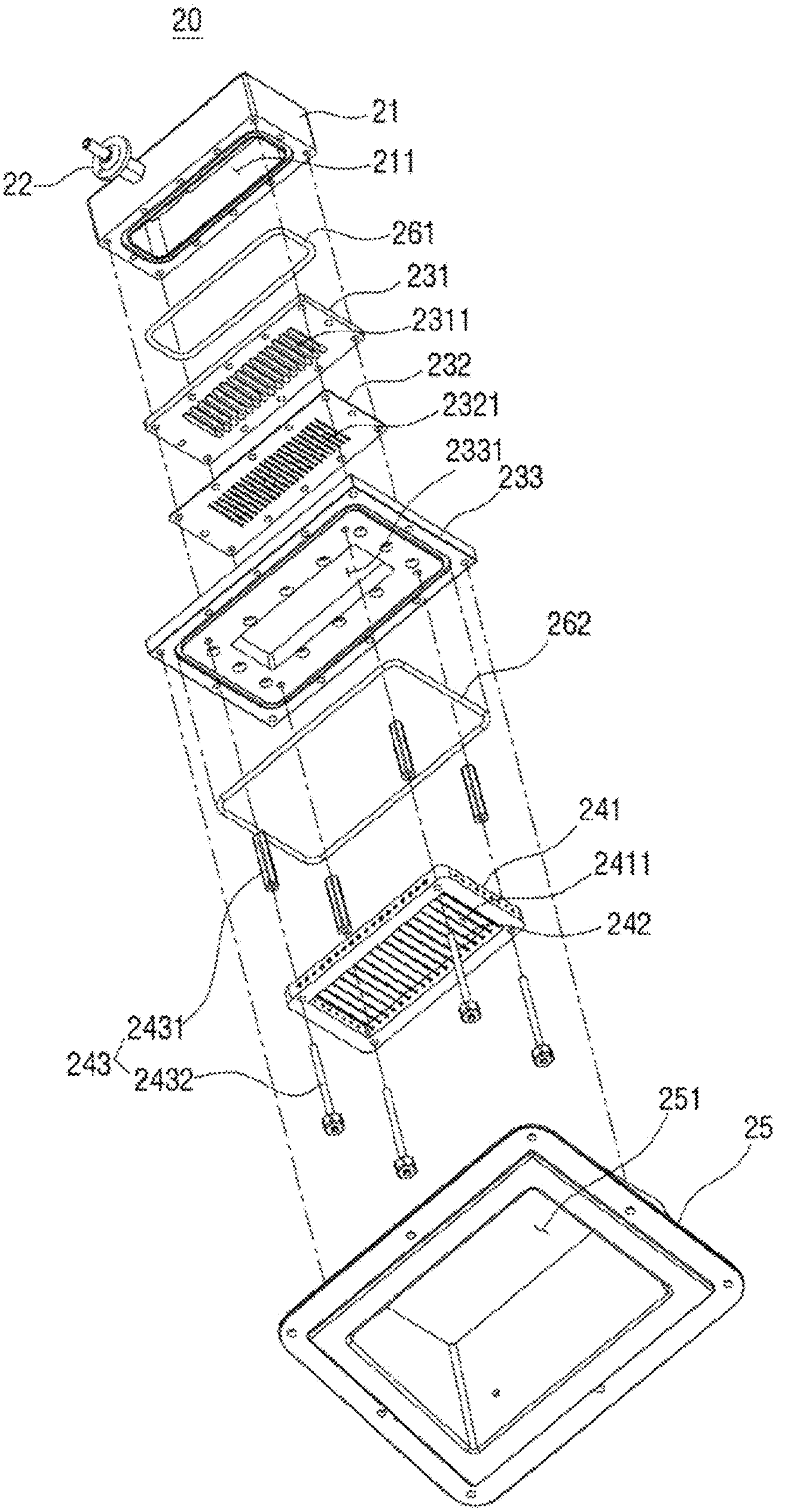
FIG. 5 is an exploded perspective view illustrating an electrostatic sprayer of FIG. 4.

FIG. 4 is a perspective view illustrating an electrostatic sprayer of FIG. 3 viewed from another angle, and FIG. 5 is an exploded perspective view illustrating an electrostatic sprayer of FIG. 4.

Referring to FIG. 4 and FIG. 5, the structure of the electrostatic sprayer 20 will be detailed.

The electrostatic sprayer 20 may be disposed on the mixing part 13 to spray the charged droplets toward the outside air flowing into the mixing part 13.

To be specific, the electrostatic sprayer 20 may include an accommodation part 21 for storing water, a first electrode part 22 for applying a voltage to the accommodation part 21, a nozzle part 23 combined with the accommodation part 21 to spray droplets to the mixing part 13, and a second electrode part 24 disposed between the nozzle part 23 and the mixing part 13 and to which an electrode opposite to the electrode of the first electrode part 22 is applied.

The accommodation part 21 may be disposed on the electrostatic sprayer 20 to provide the accommodated water to the nozzle part 23. The accommodation part 21 may be disposed on the nozzle part 23.

The first electrode part 22 may be combined with the accommodation part 21 to apply a first electrode to water stored in the accommodation part 21, and the first electrode part 22 may be connected to an additional power source part (not shown) so that power is applied.

The accommodation part 21 may be formed of a conductive metal material, and the first electrode part 22 may be combined with the outer surface of the accommodation part 21 to apply the first electrode to the accommodation part 21, so that the water stored in the accommodation part 21 may be charged with the first electrode.

The first electrode applied to the accommodation part 21 through the first electrode part 22 may be plus polarity or minus polarity, but an electrode opposite to a second electrode applied to the second electrode part 24 may be applied. For example, the first electrode may be plus polarity, and the second electrode may be minus polarity.

The first electrode part 22 may be disposed in the accommodation part 21 and may directly apply the first electrode to the water stored in the accommodation part 21.

The accommodation part 21 may be connected to an additional water feeding part (not shown) to be provided with water from the water feeding part. The water feeding part may be connected to the water storage 14 to supply the water stored in the water storage 14 to the accommodation part 21, and the water in the electric dust collecting device 1 may be circulated to the water storage 14 and the accommodation part 21. However, the water stored in the water storage 14 may be contaminated, so that the water feeding part may further include an additional water filter.

The accommodation part 21 may include an opening 211 formed on a bottom thereof, and the nozzle part 23 may be coupled to the lower side of the accommodation part 21 to cover the opening 211 of the accommodation part 21, and thus water may be provided through the opening 211 of the accommodation part 21.

The nozzle part 23 may be combined with the accommodation part 21, including a nozzle plate 231 having a plurality of openings 2311 disposed therein, and a nozzle film 232 combined with the lower side of the nozzle plate 231 and having a plurality of spraying holes 2321.

The nozzle plate 231 may couple the nozzle film 232 to the accommodation part 21, including the plurality of openings 2311 connected to the opening 211 of the accommodation part 21. The nozzle part 23 may also have a structure in which the nozzle film 232 is directly coupled to the lower side of the accommodation part 21 without the nozzle plate 231.

Water accommodated in the accommodation part 21 may sequentially pass through the opening 211 of the accommodation part 21 and the opening 2311 of the nozzle plate 231, and penetrate the spraying hole 2321 of the nozzle film 232 to be sprayed with a droplets of a micro size.

The nozzle film 232 may be a film with the thickness of 25 μm to 100 μm, and formed of a synthetic resin material such as polyethylene terephthalate.

The nozzle film 232 may include a plurality of spraying holes 2321 formed therein, and it is preferable that the diameter of the spraying hole 2321 to form a droplets is between 25 μm and 50 μm. The spraying hole 2321 may be provided to the nozzle film 232 through laser drilling.

A first sealing member 261 may be disposed between the nozzle plate 232 and a combination part of the accommodation part 21.

The first sealing member 261 may seal between the nozzle plate 231 and the accommodation part 21 to prevent water stored in the accommodation part 21 from being leaked.

It is preferable that first sealing member 261 is formed of rubber or poly urethane, and the first sealing member 261 has a ring shape formed along the outermost of the plurality of openings 2311 of the nozzle plate 231.

A nozzle bracket 233 supporting the nozzle plate 231 may be combined with the lower side of the nozzle plate 231 combined with the nozzle film 232.

The nozzle bracket 233 may include the opening 2331 corresponding to the arrangement of the plurality of spraying holes 2321 of the nozzle film 232. The nozzle plate 231 may be combined with the outer part of the opening 2331 of the nozzle bracket 233, so that the nozzle bracket 233 may support the nozzle plate 231.

The second electrode part 24 may be combined with the nozzle part 23 at a preset distance under the nozzle bracket 233.

The second electrode part 24 may be disposed to be spaced apart from the nozzle part 23 at a preset distance under the nozzle part 23 to apply the second electrode opposite to the first electrode of the first electrode part 22 to the droplets sprayed from the nozzle part 23.

The second electrode part 24 may include a frame 241 in a ring shape including an opening 2411 corresponding to the arrangement of the plurality of spraying holes 2321 of the nozzle film 232, and a plurality of second electrode wires 242 arranged to cross the opening 2411 of the frame 241.

Referring to FIG. 5, the frame 241 may have a square ring shape. The second electrode wire 242 may be connected to both sides of the frame 241, so that the plurality of second electrode wires 242 may be disposed on the opening 2411 of the frame 241 in parallel.

The second electrode may be applied to the frame 241 through an additional power source (not shown), and the second electrode may be applied to the second electrode wire 242 arranged to be opposite to the plurality of spraying holes 2321.

As the second electrode is applied to the frame 241 and the second electrode wire 242, the second electrode part 24 may apply the second electrode to the droplets charged to the first electrode that is sprayed from the plurality of spraying holes 2321.

An electric field may be formed between the first electrode part 22 and the second electrode part 24, and the water charged with the first electrode on the accommodation part 21 through the first electrode part 22 may be sprayed to the mixing part 13 in the form of charged micro droplets by passing through the plurality of spraying holes 2321 through ion evaporation and coulombic explosion generated by the second electrode of the second electrode part 24, which is opposite to the first electrode.

The second electrode wire 242 may be formed of a conductive tungsten material, and it is preferable that the diameter of the second electrode wire 242 is 0.08 mm to 0.15 mm.

Droplets sprayed from the plurality of spraying holes 2321 may pass through the opening 2411 formed inside the frame 241, and thus, the droplets sprayed from the plurality of spraying holes 2321 may pass the opening 2331 of the nozzle bracket 233, and penetrate the opening 2411 of the frame 241 to be sprayed to the mixing part 13.

The second electrode part 24 may include a plurality of connection members 243 to connect the frame 241 to the nozzle bracket 233, so that the second electrode part 24 may be spaced apart from the nozzle part 23 at a preset distance.

The second electrode part 24 may be combined with the nozzle bracket 233 through the plurality of connection members 243.

Referring to FIG. 5, the plurality of connection member 243 may be respectively disposed on the edges of the frame 241.

Each of the plurality of connection members 243 may include a connection pillar 2431 having one end contacting the edge of the frame 241 and the other end contacting the nozzle bracket 233, and a coupling member 2432 in which one end part thereof sequentially penetrates the frame 241 and the connection pillar 2431 in combination with the nozzle bracket 233 to couple the frame 241, the connection pillar 2431, and the nozzle bracket 233.

One end of the coupling member 2432 and the nozzle bracket 233 may be screwed together. For example, one end of the coupling member 2432 may include a male screw part (not shown) that can be screwed to the nozzle bracket 233, and the nozzle bracket 233 may include a female screw part (not shown) corresponding to one end of the coupling member 2432. In addition, the frame 241 and the connection pillar 2431 may include a hole formed to allow the coupling member 2432 to be coupled in penetration.

In order that the first electrode part 22 and the second electrode part 24 form an electric field, and the water accommodated in the accommodation part 21 is to be sprayed to the mixing part 13 with the charged droplets, it is preferable that the second electrode part 24 is disposed to be spaced apart from the spraying hole 2321 of the nozzle part 23 at the distance of 50 mm to 70 mm. The length of the connection pillar 2431 may be formed to be 50 mm to 70 mm.

The electrostatic sprayer 20 may further include a connection member 25 to connect the nozzle bracket 233 to the mixing part 13.

The connection member 25 may be disposed under the nozzle bracket 233 to cover the side of the second electrode part 24.

Referring to FIG. 4 and FIG. 5, the connection member 25 may be, for example, in a shade shape, and may connect the mixing part 13 to the nozzle part 23 so that the droplets sprayed through the nozzle part 23 may easily move to the mixing part 13.

For example, the opening 251 formed on one side of the connection member 25 may be combined with the mixing part 13 to be connected to the opening formed on the upper surface of the mixing part 13, and the opening formed on the other side of the connection member 25 may be combined with the nozzle bracket 233 to be included in the spraying hole 2321 of the nozzle part 23, so that the droplets sprayed through the nozzle part 23 may penetrate the inside of the connection member 25 to flow into the mixing part 13.

Therefore, the droplets sprayed through the nozzle part 23 may flow into the mixing part 13 without loss, and it is preferable that the width of the flow path of the connection member 25 increases from the other side close to the nozzle part 23 toward one side close to the mixing part 13.

A second sealing member 262 may be disposed between the other side of the connection member 25 combined with the nozzle bracket 233 and a coupling part of the nozzle bracket 233.

The second sealing member 262 may close between the nozzle bracket 233 and a coupling part of the connection member 25 to prevent droplets sprayed from the nozzle part 23 from being leaked.

It is preferable that the second sealing member 262 is formed of a rubber material or polyurethane, in a ring shape corresponding to the shape of the other side of the connection member 25.

The charged droplets sprayed to the mixing part 13 through the electrostatic sprayer 20 may have polarity, so that it can be condensed with the contaminants contained in the outside air flowing into the mixing part 13. Therefore, the air in the mixing part 13 may be purified.

The droplets condensed with the contaminants in the mixing part 13 may be absorbed in the dust collecting part 30 and collected in the water storage 14. Thus, the clean air purified by the mixing part 13 may be discharged to the outside through the dust collecting part 30 and the exhaust hole 111.

The droplets sprayed through the electrostatic sprayer 20 may be applied a high-voltage power to be charged. Therefore, it is possible to easily remove contaminants such as fine dust, bacteria, mold, and water soluble odor particles\in the air.

In addition, a high-voltage electrode may be directly applied to the accommodation part 21, so that the germs or molds contained in the water accommodated in the accommodation part 21 may also be removed.

The electrostatic sprayer 20 of the electric dust collecting device 1 may charge water stored in the accommodation part 21 by directly applying the first electrode to the accommodation part 21, and a nozzle for spraying fine droplets is realized with the nozzle film 232 having the plurality of spraying holes 2321 formed therein. In this regard, the structure of the electrostatic sprayer 20 could be simplified. Therefore, it is possible to easily manufacture the electric dust collecting device 1 including the electrostatic sprayer 20 as well as to reduce manufacturing costs.

The nozzle part 23 of the electrostatic sprayer 20 may be replaced with a conventional nozzle in a spray type, and in this case, a water feeding part may be directly connected to a nozzle in a spray type without an additional accommodation part to spray the droplets to the mixing part 13.

Figure 6:
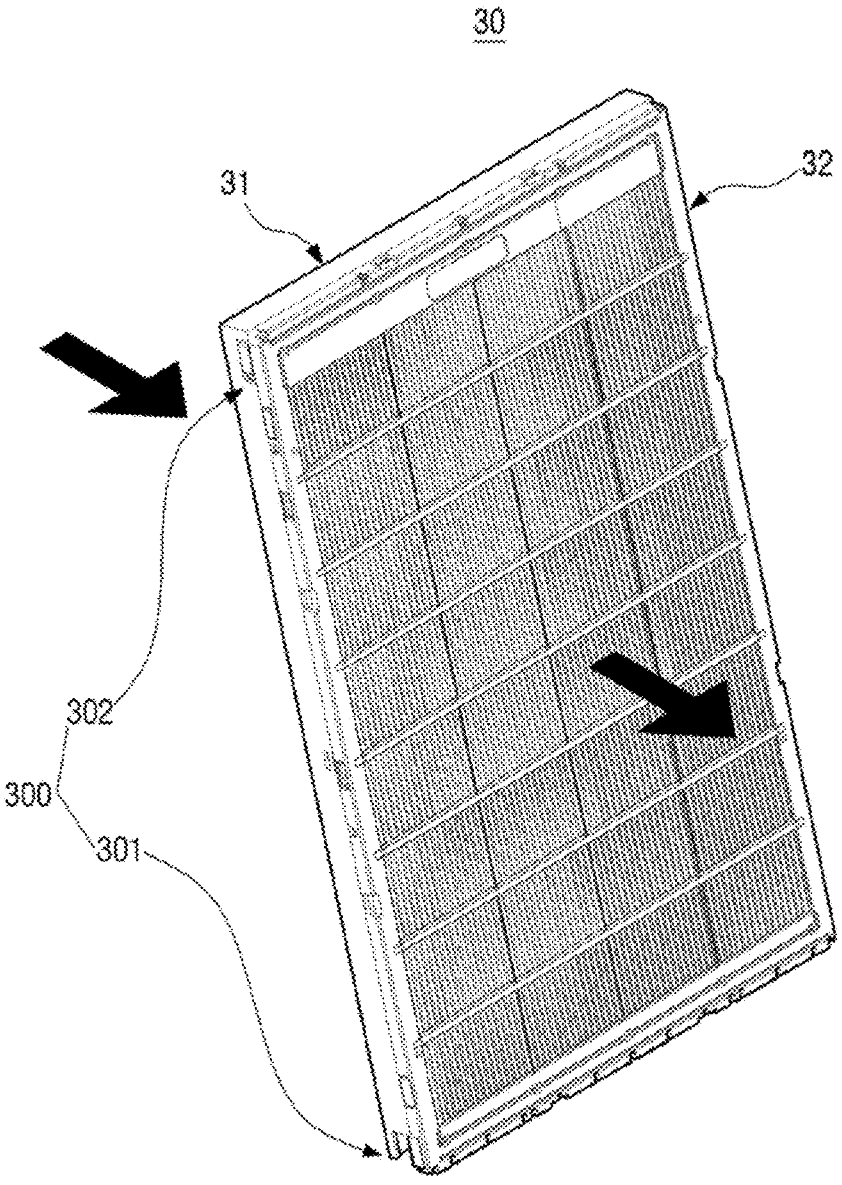
FIG. 6 is a perspective view illustrating a dust collecting device of FIG. 3.
Figure 7:
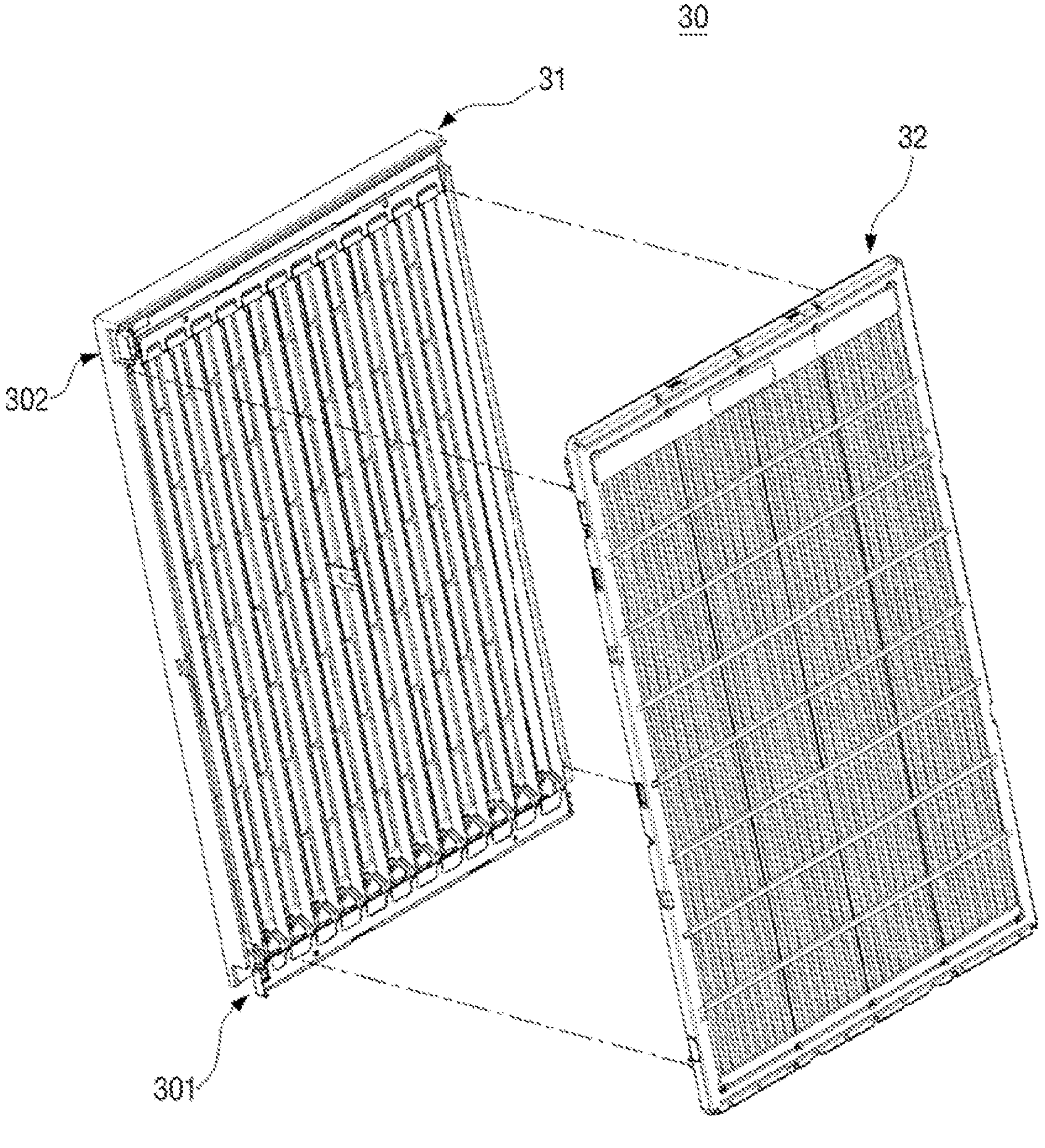
FIG. 7 is an exploded perspective view illustrating a dust collecting device of FIG. 6.

FIG. 6 is a perspective view illustrating a dust collecting part 30 of FIG. 3, and FIG. 7 is an exploded perspective view illustrating the dust collecting part 30 of FIG. 6.

The dust collecting part 30 may include a charging part 31 and an absorption part 32, and referring to FIG. 6, the air purified in the mixing part 13 may pass through the charging part 31 oppositely disposed to the mixing part 13 and the absorption part 32 combined with the charging part 31 to be discharged to the exhaust hole 111.

The charging part 31 may be oppositely disposed to the mixing part 13 to charge the droplets condensed with the contaminants, and the absorption part 32 may absorb the droplets charged from the charging part 31.

The air from which contaminants are removed by droplets may pass through the dust collecting part 30 to be discharged through the exhaust hole 111, and also micro droplets not combined with the contaminants may pass through the dust collecting part 30 to be discharged through the exhaust hole 111.

The electric dust collecting device 1 may not only purify introduces outside air, but may discharge micro droplets not combined with the contaminants to the outside, the indoor air may maintain an appropriate humidity level. In other words, the electric dust collecting device 1 may function as both an air conditioner, and a humidifier.

Referring to FIG. 3, the dust collecting part 30 may be disposed downstream of the mixing part 13 and may absorb the droplets combined with the contaminants contained in the outside air on the mixing part 13. The dust collecting part 30 disposed to be inclined at a present angle ($\alpha 1$) with respect to a horizontal plane.

The droplets absorbed on the dust collecting part 30 while being combined with the contaminants may be condensed in the form of water drop in the dust collecting part 30, and the condensed droplets may flow down to the lower end of the dust collecting part by gravity. In other words, elements constituting the charging part 31 and the absorption part 32 may be disposed to be inclined at the preset angle ($\alpha 1$) with respect to a horizontal plane, and thus droplets condensed to the charging part 31 and the absorption part 32 may downwardly move by gravity.

A high voltage may be applied to the dust collecting part 30 so that the droplets combined with the contaminants in the mixing part 13 may be charged and absorbed. Therefore, the draining part 300 for discharging the droplets absorbed in the dust collecting part 30 may be combined to prevent malfunction such as short-circuit, tracking or leakage generated due to the droplets condensed in the dust collecting part 30.

Referring to FIG. 6 and FIG. 7, the draining part 300 may include a first draining part 301 disposed on the lower side of the dust collecting part 30 and a second draining part 302 disposed on the upper side of the dust collecting part 30.

The droplets condensed in the dust collecting part 30 may flow downwardly by gravity, so that the droplets may be discharged to the outside of the dust collecting part 30 through the first draining part 301. In addition, the droplets condensed on the upper side of the dust collecting part 30 may be discharged to the outside through the second draining part 302.

The detailed configuration of the dust collecting part 30 provided with the draining part 300.

Figure 8:
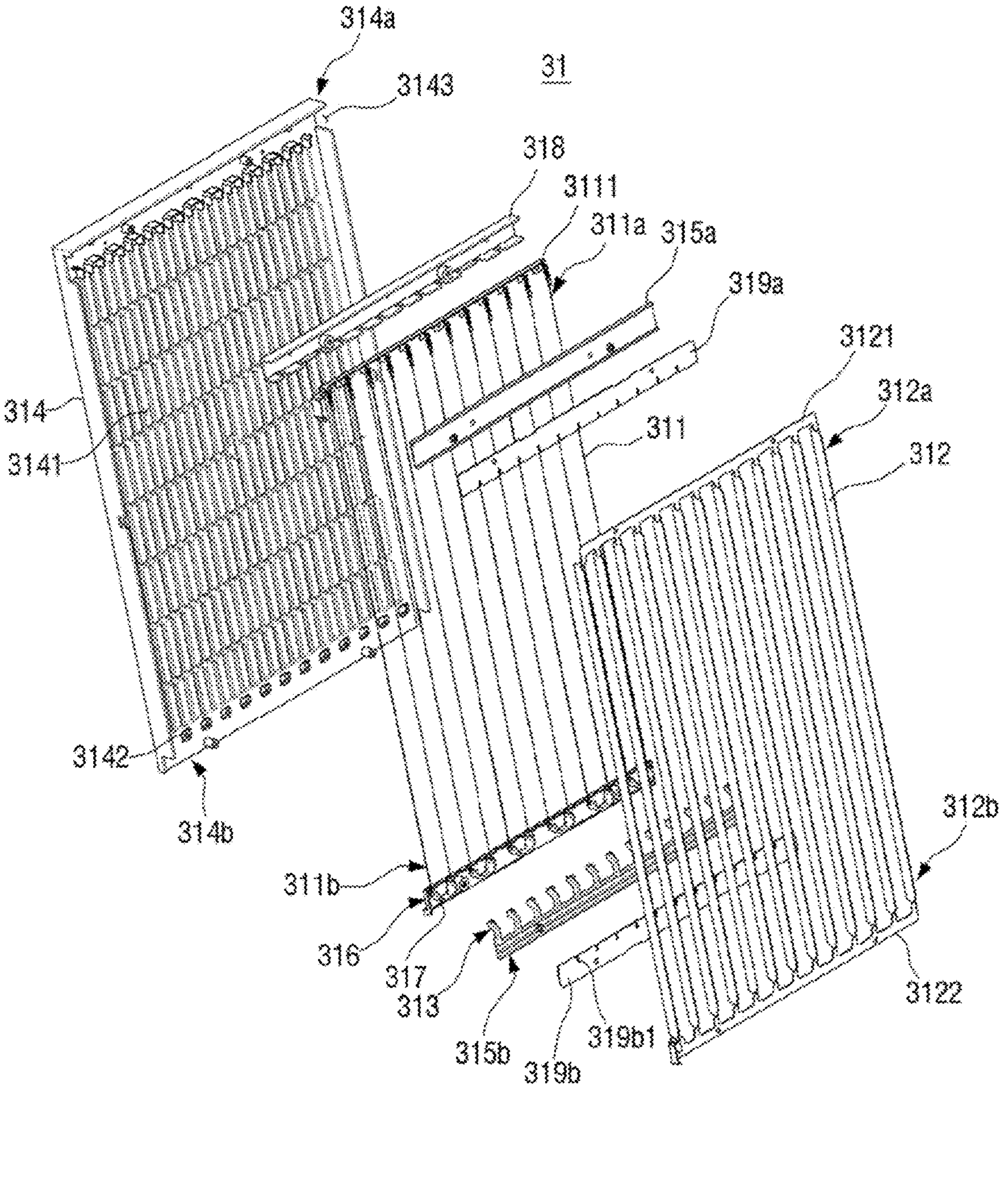
FIG. 8 is an exploded perspective view illustrating a charging part of FIG. 7.

FIG. 8 is an exploded perspective view illustrating a charging part of FIG. 7.

Referring to FIG. 8, the structure of the charging part 31 will be described.

The charging part 31 may include a plurality of charge wires 311 to which a high voltage is applied, a plurality of ground plates 312 disposed between the plurality of charge wires 311, and a charging part cover 314 for covering the plurality of charge wires 311 and the plurality of ground plates 312 on one side.

The charging part cover 314 may be a plate in a square shape, which is formed of an insulating resin material, and disposed oppositely to the mixing part 13, including a plurality of intake ports 3141 through which droplets condensed with contaminants in the mixing part 13 flows. In addition, the plurality of intake ports 3141 of the charging part cover 314 may be disposed on the charging part cover 314 in a grid pattern.

The plurality of charge wires 311 to which a high voltage power is applied may be arranged in the charging part cover 314 along a length direction of the charging part 31, and the plurality of charge wires 311 may be disposed in parallel along a width direction of the charging part 31.

The plurality of charge wires 311 may be formed of a conductive tungsten material.

The plurality of ground plates 312 in a plate shape extending along a length direction of the charging part 31 may be disposed between the plural of charge wires 311, and the plurality of charge wires 311 and the plurality of ground plates 312 may be disposed alternately in the charge part cover 314.

The plurality of ground plates 312 may be formed of a metal material such as aluminum.

Each upper end part 311*a* of the plurality of charge wires 311 may be applied high-voltage power in connection with the power source connection part 3111, for example, the plurality of charge wires 311 may be applied a high voltage of plus polarity.

The plurality of ground plates 312 disposed between the plurality of charge wires 311 may be grounded, but unlike the plurality of charge wires 311 to which a high voltage of plus polarity is applied, may be charged to minus polarity.

Therefore, when a high voltage of plus polarity is applied to the plurality of charge wires 311, corona discharging may occur between the plurality of charge wires 311 and the plurality of ground plates 312.

Droplets condensed with contaminants introduced through the plurality of intake ports 3141 of the charge part cover 314 may be charged to the plus polarity. In addition, the contaminants contained in the outside air may directly flow into the charging part 31 through the plurality of intake ports 3141 of the charging part cover 314, and may be charged to the plus polarity through the charging part 31.

The droplets charged to the plus polarity through the charging part 31 may be absorbed to the ground plate 322 of the absorption part 32. The detailed description thereof will be omitted.

The charging part 31 may include a plurality of winding parts 317 disposed on the lower end of the charging part 31 and in which each of a plurality of charge wires 311 is wound.

To be specific, one end of the charge wire 311 may be connected to the power source connection part 3111 disposed on the upper end of the charging part 31, and the center of the charge wire 311 may be wound by the winding part 317 disposed on the lower end of the charging part 31, so that the other end opposite to one end of the charge wire 311 may be connected to the power source connection part 3111.

The dust collecting part 30 may charge droplets condensed with contaminants in the mixing part 13, and absorb the charged droplets, so that the droplets may be condensed in the dust collecting part 30. The draining part 300 may be combined with the dust collecting part 30 to prevent short-circuit, tracking or leakage by the condensed droplets.

To be specific, the droplets passing through the intake port 3141 of the charging part cover 314 may be condensed on the charging part cover 314, the plurality of charge wires 311 and the plurality of ground plates 312.

The charging part 31 may be disposed to be inclined at the preset angle (α1) with respect to a horizontal plane, the droplets condensed on the charging part cover 314, the plurality of charge wires 311 and the plurality of ground plates 312 may drop down by gravity.

The draining part 300 may discharge the droplets flowing down along the charging part cover 314, the plurality of charge wires 311, and the plurality of ground plates 312, and the droplets condensed on the upper side of the charging part 31 to the outside of the charging part 31.

Figure 9:
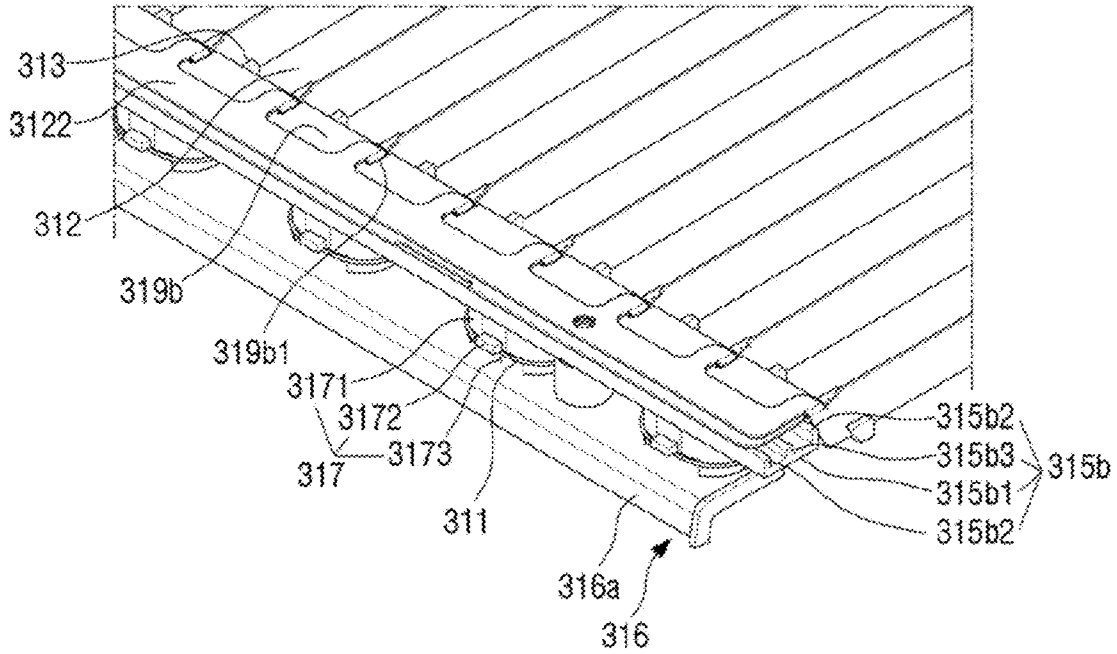
FIG. 9 is an enlarged perspective view illustrating the lower end of a charging part of FIG. 7 viewed from another angle.
Figure 10:
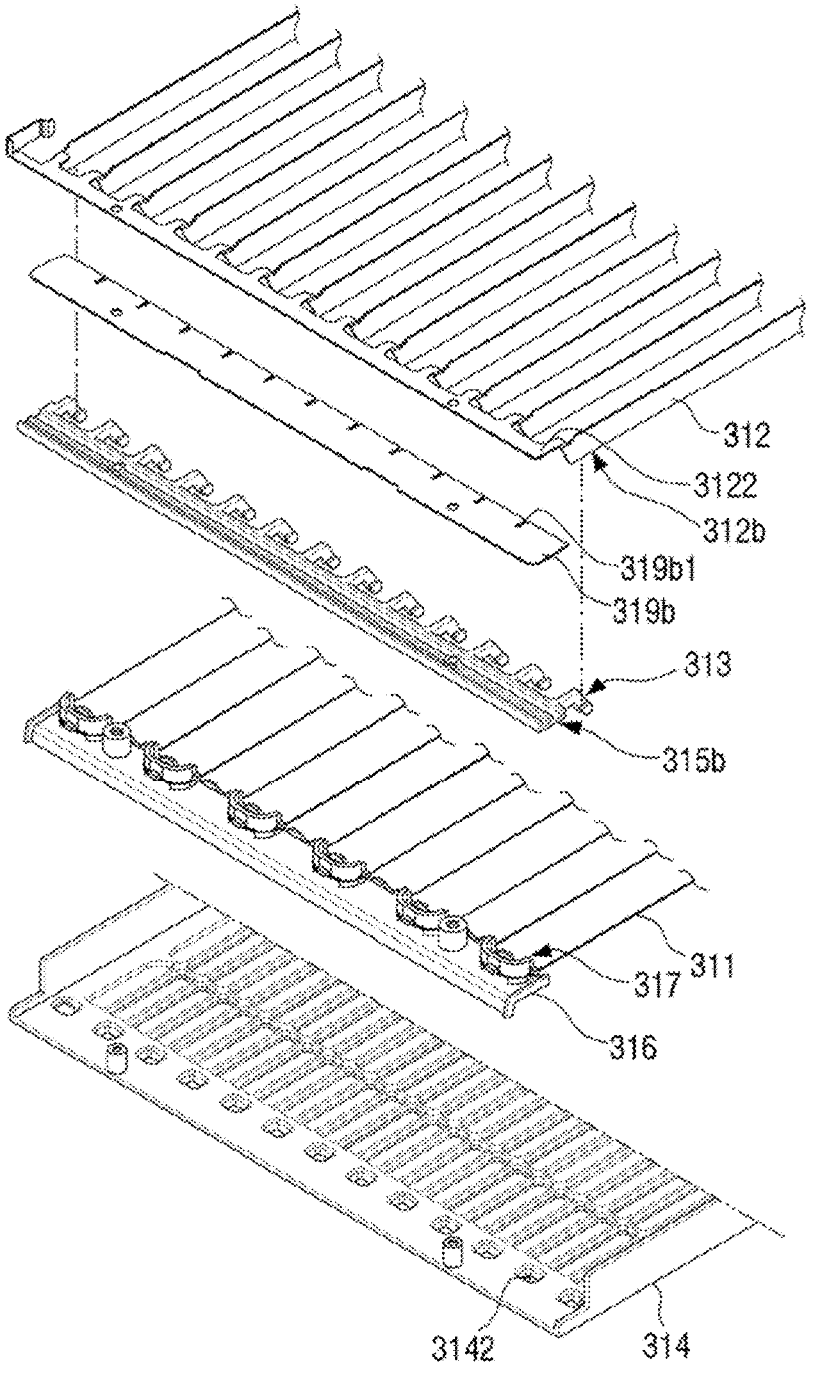
FIG. 10 is an exploded perspective view illustrating a charging part of FIG. 9.

FIG. 9 is an enlarged perspective view illustrating the lower end of a charging part 31 of FIG. 7 viewed from another angle, FIG. 10 is an exploded perspective view illustrating a charging part 31 of FIG. 9, and FIG. 11 is an enlarged perspective view illustrating part of a charging part 31 of FIG. 9 viewed from another angle.

Referring to FIG. 8, FIG. 9, FIG. 10, and FIG. 11, a first draining part 301 applied to the lower side of the charging part 31 will be described based on the lower end part of the charging part 31. The first draining part 301 may be an additional configuration combined with the charging part 31, and may be a draining structure applied to the charging part 31.

The charging part 31 may include the first draining part 301 disposed on the lower part thereof to easily discharge droplets flowing down the lower side of the charging part 31 to the outside by gravity.

To be specific, the first draining part 301 may include a plurality of condensation units 313 combined with each lower end part 312*b* of the plurality of ground plates 312.

Each of the plurality of condensation units 313 may be combined with the corresponding ground plate 312, including an insert groove 3131 into which the lower end part 312*b* of the ground plate 312 is inserted, and an inclination part 3132 for covering part of both side surfaces of the ground plate 312.

The condensation unit 313 may be formed of an insulating synthetic resin material, and the ground plate 312 may be inserted into the condensation unit 313 in a standing state, so that the condensation unit 313 may cover the side part of the ground plate 312.

In addition, the thickness of the condensation unit 313 may be greater than the thickness of the ground plate 312, and the inclination part 3132 covering the side part of the ground plate 312 may have a greater surface area than the edge of the ground plate 312 having a line shape.

The droplets condensed with the ground plate 312 may flow down from the upper end part 312*a* to the lower end part 312*b* by gravity to be accumulated in the condensation unit 313.

A droplets in the form of water drop, which becomes larger for being accumulated in the condensation unit 313, may be drop down to the lower side of the condensation unit 313 due to its weight.

The droplets condensed on the ground plate 312 may be accumulated on the condensation unit 313 combined with the lower end part 312*b* of the ground plate 312, and the accumulated droplets may drop to the outside to prevent the droplets condensed on the ground plate 312 from being short-circuited or tracked with the adjacent charge wire 311 or the adjacent ground plate 312.

The charging part cover 314 may include a plurality of draining holes 3142 formed on the positions opposite to the plurality of condensation units 313.

The inclination part 3132 of the plurality of condensation units 313 may be inclined downwardly toward the plurality of draining holes 3142 of the charging part cover 314. The droplets accumulated in the condensation unit 313 may drop to the draining hole 3142 of the charging part cover 314 to be discharged to the outside of the charging part cover 314*b*. The droplets discharged through the draining hole 3142 of the charging part cover 314 may be stored in the water storage 14.

The charging part 31 may include a first connection plate 3121 connecting the upper end of the plurality of ground plates 312, and a second connection plate 3122 connecting the lower end of the plurality of ground plates 312. The plurality of ground plates 312 may be connected to one another.

The plurality of ground plates 312 may be coupled to the first and second connection plates 3121 and 3122 to be perpendicular to each other, and the first and second connection plates 3121 and 3122 may be combined with the charging part cover 314, so that the plurality of ground plates 312 may be disposed corresponding to the plurality of intake ports 3141 of the charging part cover 314.

The charging part 31 may be disposed under each of the first and second connection plates 3121 and 3122, including the first and second connection insulation plates 319*a* and 319*b* that insulate between the first and second connection plates 3121 and 3122 and the charging part cover 314.

The first and second insulation plates 319*a* and 319*b* may be formed of an insulating synthetic resin material such as polyester.

A high-voltage power may be applied to the plurality of charge wires 311 of the charging part 31, so that the charging part cover 314 may be charged. Therefore, by respectively combining the first and second connection plates 3121 and 3122 with the first and second insulation plates 319*a* and 319*b*, it is possible to insulated between the first and second connection plates 3121 and 3122 combined with the plurality of ground plates 312 the charging part cover 314.

The first connection plate 3121 and the power source connection part 3111 to which a high-voltage power is applied may be insulated to each other through the first insulation plate 319*a*.

The first and second insulation plates 319*a* and 319*b* may include a plurality of ground grooves 319*a*1 and 319*b*1 into which the upper end and the lower end of the ground plate 312 are inserted, and the both ends of the ground plate 312 may be inserted into the ground grooves plurality of ground grooves 319*a*1 and 319*b*1, so that the first and second insulation plates 319*a* and 319*b* may be closely combined with the first and second connection plates 3121 and 3122.

In order to improve the effect of insulation, the first and second insulation plates 319*a* and 319*b* may have greater areas than the first and second connection plates 3121 and 3122.

The draining part 300 may be disposed under at least one of the upper end part of the lower end part of the plurality of ground plates 312, including the first draining guide units 315*a* and 315*b* extending along a width direction of the charging part 31.

Referring to FIG. 8, the first draining guide units 315*a* and 315*b* each may be disposed under the upper end and the lower end of the charging part 31. The first draining part 301 may include the first draining guide unit 315*b* disposed under the charging part 31, and the second draining part 302 may include the first draining guide unit 315*a* disposed on the charging part 31.

The first draining guide unit 315*a* disposed on the charging part 31 may be disposed under the upper end part 312*a* of the plurality of charge plate 321, that is, under the first connection plate 3121, to discharge the condensed droplets to the upper end part 312*a* of the plurality of charge plates 321 and the first connection plate 3121 and the periphery thereof.

The structure of the first draining guide unit 315*a* disposed on the upper end of the charging part 31 will be described below.

Referring to FIG. 8, FIG. 9, FIG. 10, and FIG. 11, the first draining guide unit 315*b* disposed at the lower end of the charging part 31 may be disposed under the lower end part 312*b* of the plurality of charge plates 321, that is, under the second connection plate 3122.

The droplets condensed on the lower end part 312*b* of the plurality of charge plates 321, the second connection plate 3122 and the periphery thereof may move and drop down to the first draining guide unit 315*b* to the discharged to the outside.

Therefore, the droplets condensed in the second connection plate 3122 and the periphery thereof may be prevented from moving to the plurality of charge wires 311 and the plurality of ground plates 312.

The first draining guide unit 315*b* may include a bottom part 315*b*1 extending along a width direction of the charging part 31, and side wall parts 315*b*2 disposed on both sides of the bottom part 315*b*1. The first draining guide unit 315*b* may include a water flow path for discharging droplets moved to the first draining guide unit 315*b* to both ends of the first draining guide unit 315*b*.

The side wall parts 315*b*2 of the first draining guide unit 315*b* may guide the droplets flowing on the bottom part 315*b*1 to move to the both sides of the charging part 31 to be discharged.

The bottom part 315*b*1 may be formed longer than the second connection plate 3122 along the width direction of the charging part 31, and the droplets moving or dropping down from the second connection plate 3122 to the first draining guide unit 315*b* may be discharged to both ends of the first draining guide unit 315*b* along the bottom part 315*b*1 of the first draining guide unit 315*b*.

Referring to FIG. 9 and FIG. 11, the first draining guide unit 315*b* may further include a center wall 315*b*3 disposed between the plurality of side wall parts 315*b*2, and the bottom part 315*b*1 may include a plurality of water flow paths formed along the width direction of the charging part 31.

The second insulation plate 319*b* combined with the second connection plate 3122 may be disposed on the first draining guide unit 315*b*, so that the droplets condensed to the second insulation plate 319*b* may move to the first draining guide unit 315*b* to be discharged to the outside.

The first draining guide unit 315*b* may be disposed on the plurality of winding parts 317 to prevent the droplets condensed to the first connection plate 3122 and the second insulation plate 319*b* from moving to the charge wire 311 wound around the winding part 317. Therefore, it is possible to prevent the occurrence of short-circuit, tracking or leakage between the plurality of charge wires 311 and the plurality of ground plates 312.

The first draining guide unit 315*b* may be formed of an insulating synthetic resin material, insulting between the second connection plate 3122 and the winding part 317 in which the plurality of charge wires 311 are wound, and between the second connection plate 3122 and the charging part cover 314.

Referring to FIG. 8, FIG. 9, FIG. 10, and FIG. 11, the plurality of condensation units 313 and the first draining guide units 315*b* disposed under the charging part 31 may be combined, and the plurality of condensation units 313 and first draining guide unit 315*b* disposed under the charging part 31 may be integrally formed.

The droplets condensed on the plurality of ground plates 312 and moving from the upper end part 312*a* of the plurality of ground plates 312 to the lower end part 312*b* may be accumulated in the condensation unit 313 to drop down to the draining hole 3142 of the charging part cover 314, but also be discharged to the outside through the first draining guide unit 315*b*.

The droplets condensed to the plurality of ground plates 312 may drop down from the upper end part 312*a* of the ground plate 312 to the lower end part 312*b* to remove contaminants attached to the ground plate 312.

The plurality of ground plates 312 may be condensed and cleaned by droplets that flows down. Therefore, there is no additional maintenance such as additionally cleaning or replacing the plurality of ground plates 312.

The first draining part 301 may be disposed under the lower end part 311*b* of the plurality of charge wires 311, including the second draining guide unit 316 extending along the width direction of the charging part 31.

The second draining guide unit 316 may have a plate shape extending along the width direction of the charging part 31, and be formed of an insulating synthetic resin material.

The second draining guide unit 316 may be disposed under the plurality of winding parts 317 around which the plurality of charge wires 311 are wound, and the droplets condensed in the lower end part 311*b* of the plurality of charge wires 311 and the winding part 317 may move to the second draining guide unit 316 by gravity, and the droplets moving to the second draining guide unit 316 may be discharged to the outside.

The droplets condensed in the plurality of charge wires 311 may move toward the bottom end part 311*b* from the upper end part 311*a* by gravity to be accumulated on the winding part 317, and the droplets accumulated in the winding part 317 may move to the second draining guide unit 316 by gravity to be discharged to the outside.

Referring to FIG. 8, FIG. 9, FIG. 10, and FIG. 11, in order to easily discharge the droplets moving to the second draining guide unit 316 to the outside, the second draining guide unit 316 may protrude outwardly than the lower end of the charging part 31, including the draining guide unit 316*a* inclined toward the lower surface of the mixing part 13.

The inclination of the draining guide unit 316*a* may be changed according to an angle inclined with respect to the horizontal surface, and the front end of the draining guide part 316*a* may be toward the lower surface of the water storage 14.

Referring to FIG. 8, FIG. 9, FIG. 10, and FIG. 11, the plurality of winding parts 317 may be combined on the second draining guide unit 316, and the plurality of winding parts 317 and the second draining guide unit 16 may be integrally formed.

Referring to FIG. 9 and FIG. 11, the winding part 317 may include a winding member 3171 around which the charge wire 311 is wound, a plurality of winding support parts 3172 protruding from the side surface of the winding member 3171 and supporting the wound charge wire 311, and a draining hole 3173 formed on the lower end part of the winding member 3171 and opened toward the draining guide part 316*a*.

The winding member 3171 may have a pillar shape, the side surface contacting the charge wire 311 of the winding member 3171 may be a curved surface, and the charge wire 311 may be wound forming a curved line to the winding member 3171.

The plurality of winding support parts 3172 protruding from the side surface of the winding member 3171 may support the charge wire 311 wound to the winding member 3171, so that the charge wire 311 may be prevented from being deviated.

The plurality of winding support parts 3772 may be disposed from the lower end of each winding part 317 at the interval between 10 mm to 15 mm, disposed from the lower end of the winding member 3711 at the interval between 10 mm to 15 mm.

A preset distance between the plurality of charge wires 311 and the charging part cover 314 may be ensured, so that the charging part cover 314 may be prevented from being charged by the plurality of charge wires 311.

The draining hole 3173 formed at the lower end of the winding part 317 may penetrate the winding member 3171 to be opened toward the draining guide part 316*a*, and toward the lower surface of the mixing part 13, so that the drop condensed in the winding member 31711 and the winding support part 3172 may be easily discharged to the second draining guide unit 316.

The droplets stagnating between the inside of the winding member 3171 and the second draining guide unit 316 may be easily discharged to the lower end of the charging part 31 through the draining hole 3173.

The droplets condensed in the plurality of charge wires 311 may drop down from the upper end part 311*a* of the charge wire 311 to the lower end part 311*b* to remove the contaminants attached to the charge wire 311.

The plurality of charge wires 311 may be automatically cleansed by flowing droplets. Therefore, there is no need for additional maintenance such as additionally cleaning or replacing the plurality of charge wires 311.

Figure 12:
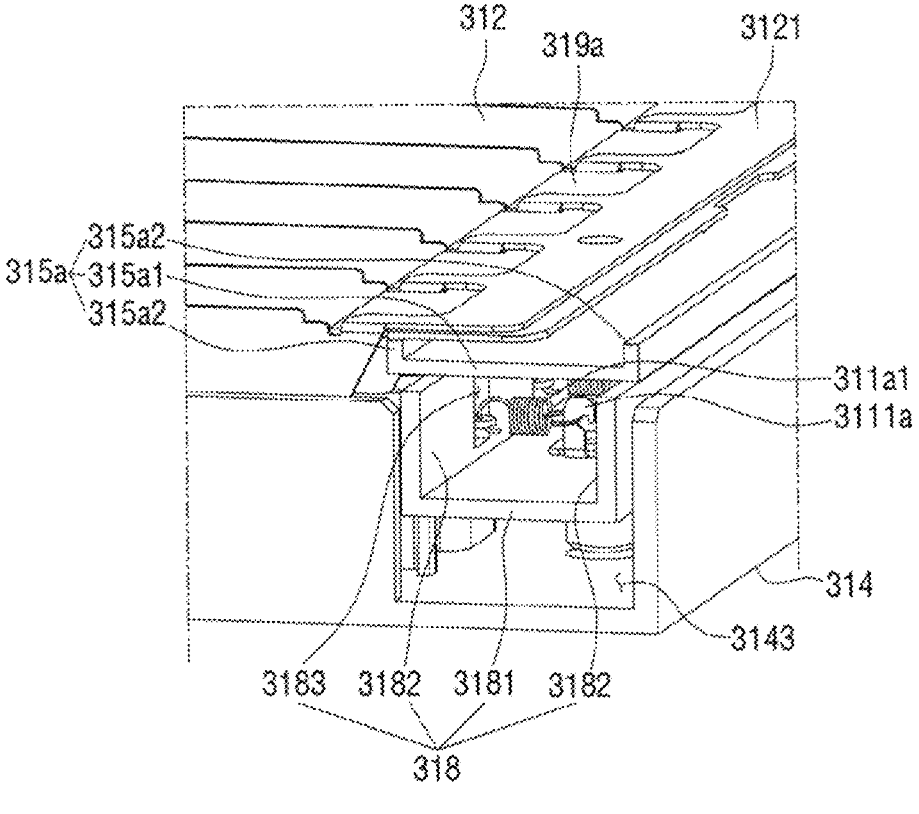
FIG. 12 is an expanded perspective view illustrating the upper end of a charging part of FIG. 7 viewed from another angle.
Figure 13:
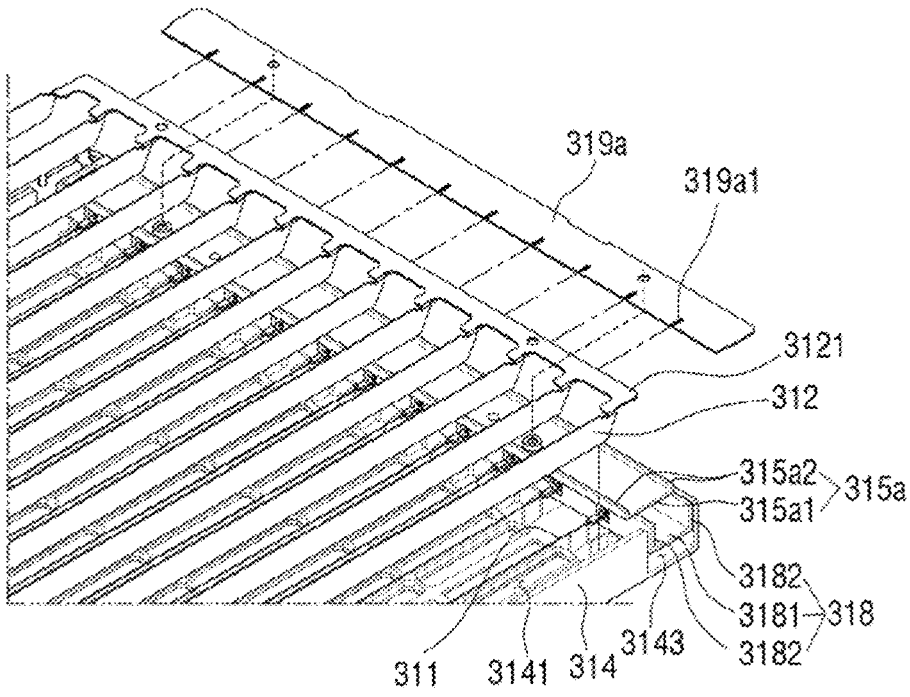
FIG. 13 is an exploded perspective view illustrating a charging part of FIG. 12.

FIG. 12 is an expanded perspective view illustrating the upper end of a charging part of FIG. 7 viewed from another angle, and FIG. 13 is an exploded perspective view illustrating a charging part of FIG. 12.

Referring to FIG. 8, FIG. 12, and FIG. 13, the second draining part 302 applied to the upper side of the charging part 31 will be described based on the upper end part of the charging part 31. The second draining part 302 may be an additional configuration combined with the charging part 31, or a draining structure applied to the charging part 31.

The second draining part 302 may include a first draining guide unit 315*a* disposed on the upper end of the charging part 31, and may be disposed under the upper end part 312*a* of the plurality of charge plates 321, that is, the first connection plate 3121.

The droplets condensed in the first connection plate 3121 and the periphery thereof may be prevented from moving to the plurality of charge wires 311 or the plurality of ground plates 312.

The first draining guide unit 315*a* disposed on the upper end of the charging part 31 may prevent the droplets condensed in the first connection plate 3121 and the periphery thereof from moving to the power source connection part 3111 to which a high-voltage power is applied.

The first draining guide unit 315*a* disposed on the upper end of the charging part 31 may include a bottom surface part 315*a*1 extending along the width direction of the charge part 31 and side wall parts 315*a*2 disposed on both sides of the bottom surface part 315*a*1. The first draining guide unit 315*a* may form a water flow path for discharging the droplets moving to the first draining guide unit 315*a* to both ends of the first draining guide unit 315*a*.

The first draining guide unit 315*a* disposed on the upper end of the charging part 31 may have the same or similar structure with the first draining guide unit 315*b* disposed under the charging part 31. Therefore, the redundant description will be omitted.

The second draining part 302 may be disposed between the upper end part 311*a* of the plurality of charge wires 311 and the charging part cover 314, extending toward the width direction of the charging part 31, including the third draining guide unit 318, of which both ends are protruding to the outer side of the charging part cover 314.

The third draining guide unit 318 may be disposed on a water flow path 3143 disposed on the upper end of the charging part cover 314*a*.

The water flow path 3143 may be a space in which part of the upper end part of the charging part cover 314*a* is opened to the both sides along the width direction of the charging part cover 314, and the droplets condensed to the charging part cover 314 may be discharged to the both sides of the charging part cover 314 through the water flow path 3143.

Referring to FIG. 12, and FIG. 13, the third draining guide unit 318 may include a bottom surface part 3181 extending along the width direction of the charging part 31, side wall parts 3182 disposed on both sides of the bottom surface part 3181, and a plurality of wire grooves 3183 formed in the side wall part 3182 disposed to be adjacent to the lower end of the charging part 31 of the side wall part 3182 disposed on both sides of the bottom surface part 3181.

The third draining guide unit 318 may form a water path to discharge the droplets moving to the third draining guide unit 318 to the both ends of the third draining guide unit 318.

For example, the droplets condensed in the power source connection part 3111 and near the upper end part 311*a* of the plurality of charge wires 311 may move to the third draining guide unit 318, and the droplets moving to the third draining guide unit 318 may be discharged to the outside through the both ends of the third draining guide unit 318 protruding toward the both ends of the charging part cover 314.

The third draining guide unit 318 may be disposed under the first draining guide unit 315*a*.

The first draining guide unit 315*a* may prevent the droplets condensed in the first connection plate 3121 and the first insulation plate 319*a* from moving to the power source connection part 3111 and the upper end part 311*a* of the plurality of charge wires 311, thereby preventing the occurrence of short-circuit, tracking or leakage between the plurality of charge wires 311 and the plurality of ground plates 312.

The first draining guide unit 315*a* may be formed of an insulating synthetic resin material, insulating between the first connection plate 3121 and the power source connection part 3111, and between the first connection plate 3121 and the charging part cover 314.

Referring to FIG. 12, one end of the plurality of elastic members 311*a*1 may be connected to each upper end part 311*a* of the plurality of charge wires 311, and the other end opposite to one end of the elastic member 311*a*1 may be connected to the power source connection part 3111.

The elastic member 311*a*1 may be a coil spring formed of a conductive metal material, and the charge wire 311 may maintain a tight state by applying a tensile force to the charge wire 311.

The power source connection part 3111 may further include a plurality of ring parts 3111*a* for fixing the other end of a plurality of elastic members.

The ring part 3111*a* of the power source connection part 3111 and the elastic member 311*a*1 may be disposed inside the third draining guide unit 318, and the elastic member 311*a*1 may be connected to the upper end part 311*a* of the charge wire 311 through the wire groove 3183 of the third draining guide unit 318.

The draining part may include the first draining guide unit 315*a* and the third draining guide unit 318 disposed on the upper end of the charging part 31 to discharge the droplets condensed on the upper end of the charging part 31 to the outside. Part of the droplets condensed on the upper end of the charging part 31 may move to the lower end by gravity to be easily discharged to the outside through the plurality of condensation units 313, the first draining guide unit 315*b*, and the second draining guide unit 316 disposed on the lower end of the charging part 31.

Figure 14:
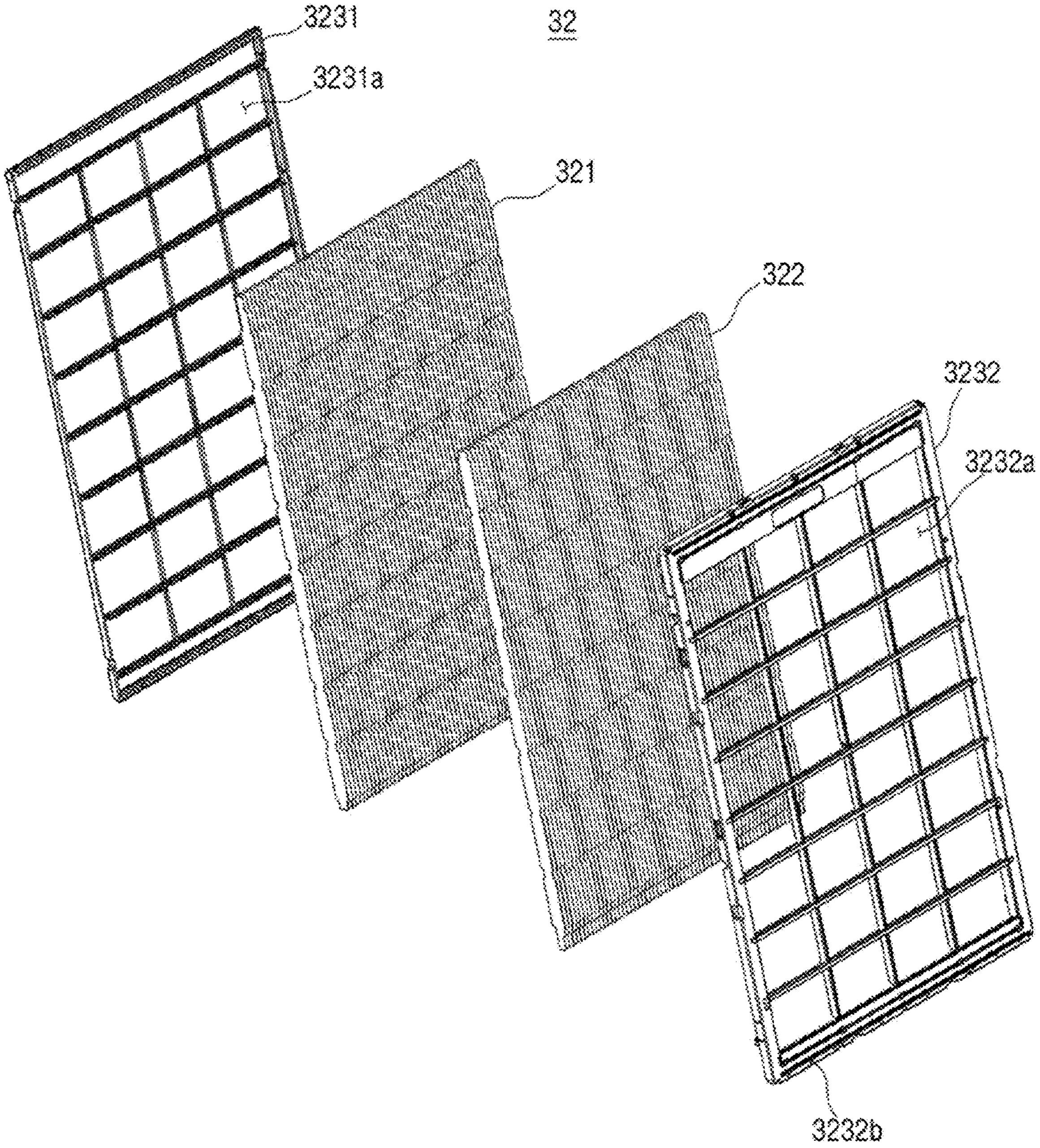
FIG. 14 is an exploded perspective view illustrating an absorption part of FIG. 7.

FIG. 14 is an exploded perspective view illustrating an absorption part 32 of FIG. 7.

Referring to FIG. 14, the structure of the absorption part 32 will be described in detail.

The absorption part 32 may be oppositely combined with the charging part 31, and may absorb the droplets condensed with the contaminants charged through the charging part 31 through an electric field.

The absorption part 32 may include a plurality of charge plates 321 disposed along the length direction of the absorption part 32 and to which power is applied, and a plurality of ground plates 322 disposed between the plurality of charge plates 321.

The plurality of charge plates 321 may be disposed in parallel along the width direction of the absorption part 32, and the plurality of ground plates 322 may be alternately arranged between the plurality of charge plates 321.

Referring to FIG. 14, the plurality of charge plates 321 and the plurality of ground plates 322 may have a plate shape extending along the length direction of the absorption part 32.

The plurality of charge plates 321 may be a polyethylene terephthalate (PET) laminated film to which a high-voltage power is applied, and the plurality of ground plates 322 may be formed of a metal material such as aluminum.

A high-voltage of plus polarity may be applied to the plurality of charge plates 321 through the power source connection part (not shown), and may form the electric field with the plurality of ground plates 322 alternately disposed.

The plurality of charge plates 321 may be charged to plus polarity, the plurality of ground plates 322 may be charged to minus polarity, unlike the charge plate 321 charged to the plus polarity.

The droplets and contaminants charged to the plus polarity through the corona discharging, which are generated from the charging part 31 may be absorbed to the plurality of ground plates 322 of the absorption part 32 by a coulombic force.

A high-voltage polarity applied to the plurality of charge plates 321 may be replace with minus polarity, not the plus polarity.

The absorption part 32 may include an absorption part cover 323 for covering the plurality of charge plates 321 and the plurality of ground plates 322, and the absorption part cover 323 may include a first absorption part cover 3231 opposite to the charging part 31 and a second absorption part cover 3232 combined with the first absorption part cover 3231.

The first and second absorption part covers 3231 and 3232 may have a square plate shape, which is formed of an insulating synthetic resin material, including a plurality of intake ports 3231*a* and 3232*a* formed to allow the droplets and air to be introduced. The plurality of intake ports 3231*a* and 3232*a* may be disposed on the first and second absorption part covers 3231 and 3232 in a grid pattern.

Figure 15:
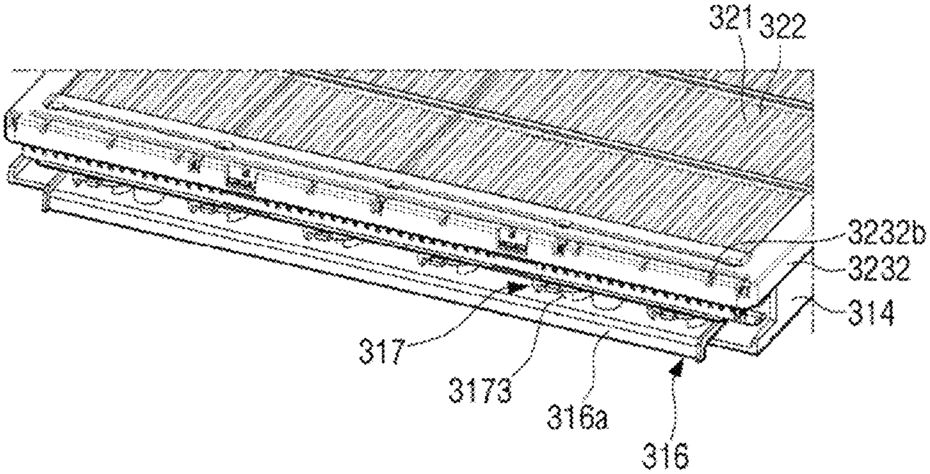
FIG. 15 is an enlarged view illustrating a charging plate and a ground plate of an absorption part of FIG. 14.

FIG. 15 is an enlarged view illustrating a charge plate 321 and a ground plate 322 of an absorption part 32 of FIG. 14.

Referring to FIG. 15, a super-hydrophilic coating layer 322*a* may be further included on both sides of the plurality of ground plates 322 disposed alternately with the plurality of charge plates 321. The super-hydrophilic coating layer 322*a* may be made of a photocatalyst material such as titanium oxide (TiO2).

The droplets combined with the dust adsorbed on the plurality of ground plates 322 through the super-hydrophilic coating layer 322*a* may easily flow down to the lower ends of the plurality of ground plates 322 by gravity.

Therefore, accumulation of droplets adsorbed on the ground plate 322 may be prevented from being tracked or short-circuited with the adjacent charge plate 321.

Further, the super-hydrophilic coating layer 322*a* may be bonded to both sides of the plurality of charge plates 321.

Figure 16:
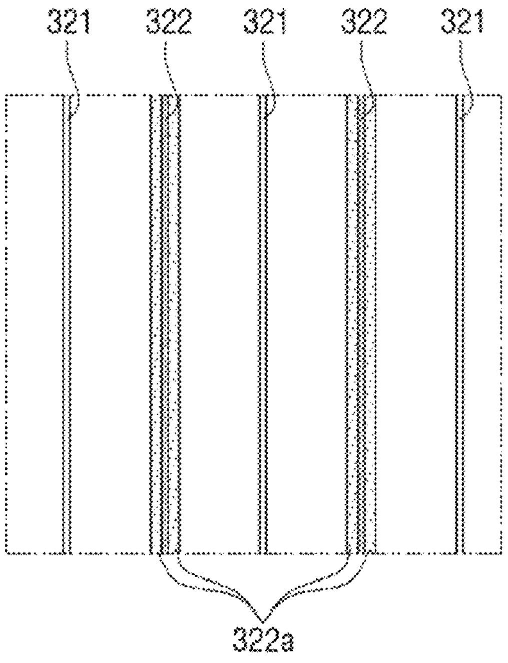
FIG. 16 is an enlarged perspective view illustrating the lower end of a dust collecting device of FIG. 6.

FIG. 16 is an enlarged perspective view illustrating the lower end of a dust collecting part 30 of FIG. 6.

Referring to FIG. 14, and FIG. 15, the first draining part 301 may include a plurality of draining holes 3232*b* formed under the second absorption part cover 3232.

When the droplet absorbed in the charge plate 321 and the plurality of ground plates 322 flows down by gravity, the droplets may be discharged to the outside through the plurality of draining holes 3232*b* of the second absorption part cover 3232.

The first absorption part cover 3231 may also include a plurality of draining holes (not shown) formed at a lower end thereof.

The absorbed or condensed droplets to plurality of charge plates 321 and the plurality of ground plates 322 of the absorption part 32 may flow down by gravity. The contaminants absorbed to the plurality of charge plates 321 and the plurality of ground plates 322 may be automatically removed.

The plurality of charge plates 321 and the plurality of ground plates 322 of the absorption part 32 may be cleansed by droplets. Therefore, there is no need for maintenance, such as additionally cleaning or replacing the absorption part 32.

Referring to FIG. 16, the droplets absorbed or condensed to plurality of charge plates 321 and the plurality of ground plates 322 of the absorption part 32 may be discharged to the outside through the plurality of draining holes 3232*b* of the second absorption part cover 3232.

The droplets condensed on the charging part 31 disposed under the absorption part 32 may include a plurality of condensation units 313, the first draining guide units 315*a* and 315*b*, and the second draining guide unit 316, the third draining guide unit 318, and the plurality of draining holes 3142 formed in the charging part cover 314.

The contaminants in the air may be easily removed because the dust collecting part 30 absorbs the droplets combined with the contaminants through an electric field. In addition, the charging part 31 and the absorption unit 32 may be automatically cleansed because the condensed or absorbed droplets drops down by gravity, and the droplets condensed or absorbed in the dust collecting part 30 may be discharged to the outside through the draining part 300, so that the droplets condensed or absorbed in the dust collecting part 30 may be discharged to the outside through the draining part 300 to prevent malfunctions such as short-circuit, tracking or leakage generated by droplets.

Figure 17:
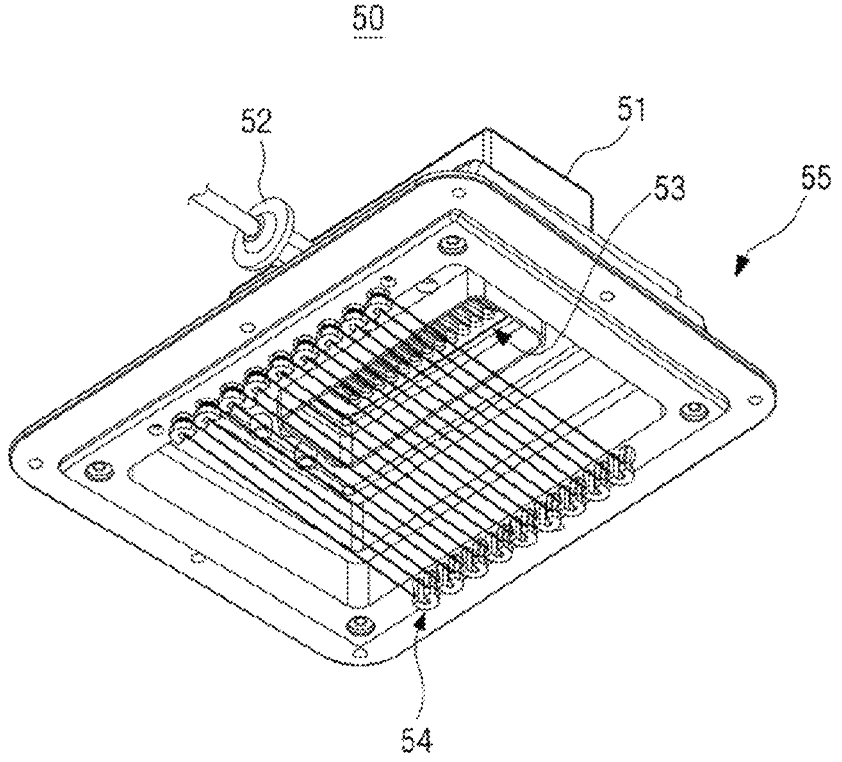
FIG. 17 is a perspective view illustrating a deformation example of an electrostatic sprayer.
Figure 18:
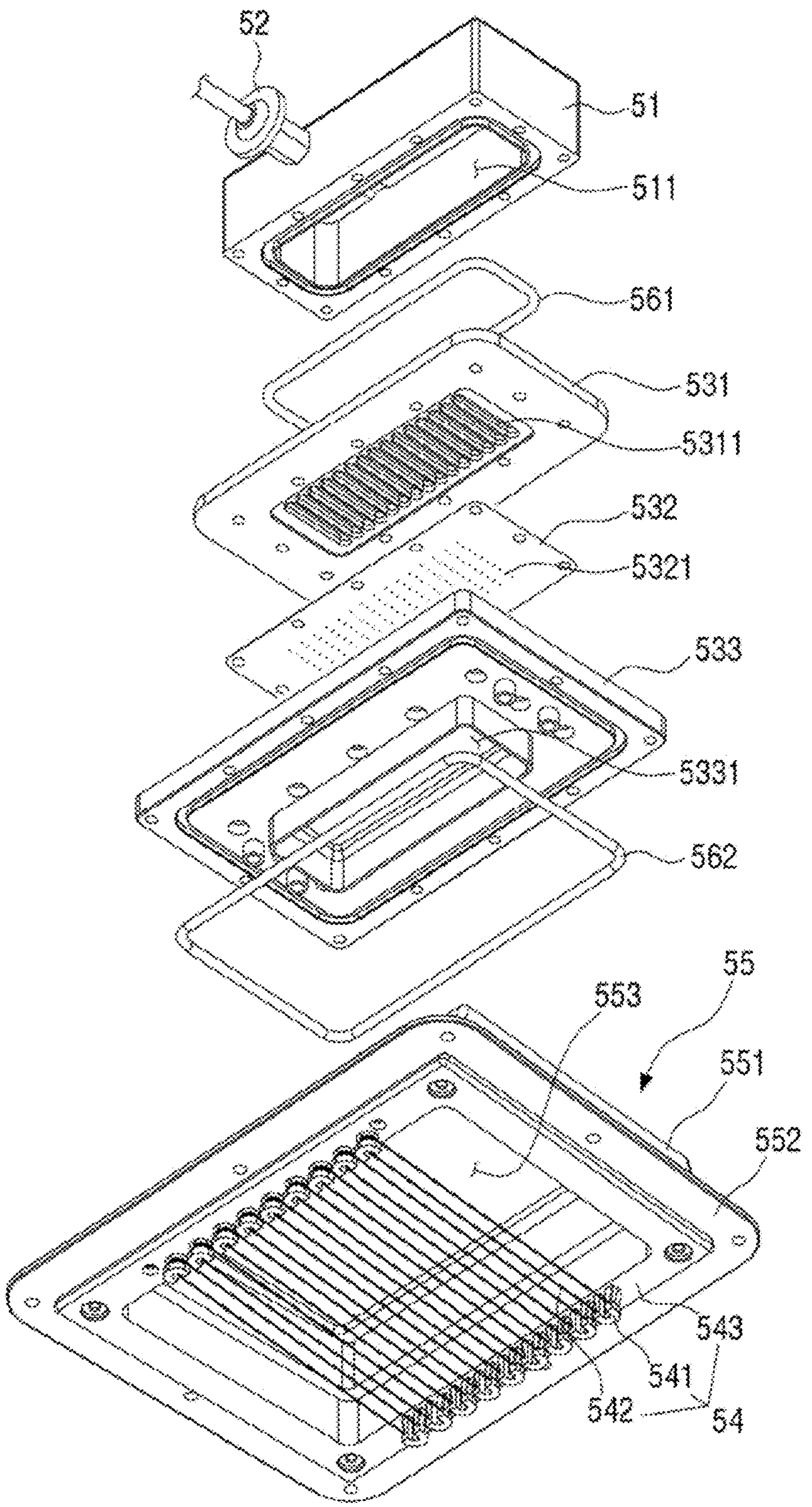
FIG. 18 is an exploded perspective view illustrating an electrostatic sprayer of FIG. 17.

FIG. 17 is a perspective view illustrating a deformation example of an electrostatic sprayer 20, and FIG. 18 is an exploded perspective view illustrating an electrostatic sprayer 50 of FIG. 17.

Referring to FIG. 17 and FIG. 18, the deformation example of the electrostatic sprayer 50 will be described. The electrostatic sprayer 50 may have the same or similar structure with the electrostatic sprayer 20 shown in FIG. 4 and FIG. 5. Therefore, the redundant description will be omitted.

The electrostatic sprayer 50 may be disposed on the mixing part 13 and may spray the charged droplets, which flows into the mixing part 13, toward the outside air, thereby condensing the contaminants contained in the outside air and the charged droplets in the mixing part 13.

The electrostatic sprayer 50 may include an accommodation part 51 for storing water, a first electrode part 52 that applied a voltage to the accommodation part, a nozzle part 53 for spraying droplets to the mixing part 13 in combination with the accommodation part 51, and a second electrode part 54 disposed between the nozzle part 53 and the mixing part 13 and to which an electrode opposite to the electrode of the first electrode part 52 is applied.

The nozzle part 53 may be combined with the accommodation part 51, including a nozzle plate 531 including a plurality of openings 5311, a nozzle film 52 including a plurality of spraying holes 5321 combined with the lower side of the nozzle plate 531, and a nozzle bracket 533 for supporting the nozzle plate 531 under the nozzle plate 531 combined with the nozzle film 532. The nozzle bracket 533 may include the opening 5331 corresponding to the arrangement of the plurality of spraying holes 5321 of the nozzle film 532.

A first sealing member 561 may be disposed for preventing leakage by closing the combination part between the accommodation part 51 and the nozzle plate 531.

The configuration and structure of the accommodation part 51, the first electrode part 52 and the nozzle part 53 of the electrostatic sprayer 50 are same or similar with those of the accommodation part 21, the first electrode part 22 and the nozzle part 23 of FIG. 4 and FIG. 5. Therefore, the redundant description will be omitted.

Referring to FIG. 17, and FIG. 18, the electrostatic sprayer 50 may further include a connection member 55 combined with the lower side of the nozzle bracket 533.

The connection member 55 may connect the nozzle bracket 533 to the mixing part 13 so that the droplets sprayed through the nozzle part 53 may move to the mixing part 13 without loss.

The connection member 55 may include a duct part 551 including an opening in which the droplets sprayed from the nozzle part 53 is moved, and a flange part 552 extending from the lower end to the side direction of the duct part 551. The duct part 551 may have a cross-section in a square shape, but the duct part 551 may have a cross section in a circular or oval shape.

The upper end of the duct part 551 may be combined with the nozzle bracket 533, and the flange part 552 may be combined with the upper surface of the mixing part 13, so that the connection member 55 may connect the nozzle part 53 to the mixing part 13.

The second sealing member 562 may be disposed between the nozzle bracket 533 and the upper end of the duct part 551, so that the droplets sprayed through the nozzle part 53 may be prevented from being leaked between the nozzle bracket 533 and the combing part of the duct part 551.

The second electrode part 54 may be combined with the lower end of the connection member 55.

The second electrode part 54 may include a plurality of second terminals 541 combined with the lower end of the connection member 55 and a plurality of second electrode wires 542 wound to the plurality of second terminal 541.

The plurality of second terminals 541 may be disposed along both sides of the lower end of the duct part 551, and the plurality of second terminals 541 disposed on the both sides of the lower end of the duct part 551 may be oppositely disposed.

Both ends of the second electrode wire 542 may be respectively connected to the second terminal 541 disposed on one side of the lower end of the duct part 551, the second terminal 541 disposed on the other side to face the second terminal 541 disposed on one side of the lower end of the duct part 551.

The plurality of second electrode wires 542 may be disposed in parallel crossing the opening 553 at the lower end of the connecting member 55.

The second electrode may be applied to the plurality of second terminals 541 through a power source part (not shown), so that the second electrode may be applied to the second electrode wire 542.

A conductive terminal plate 543 to cover the lower end of the duct part 551 may be disposed at the lower end of the duct part 551, the plurality of second terminals 541 may be combined with the terminal plate 543, and the second electrode may be applied to the terminal plate 543 through the power source part to apply the second electrode to the second terminal 541.

The first electrode may be applied to the first electrode part 52, and the second electrode opposite to the first electrode may be applied to the second electrode part 54, so that the electric field may be formed between the first electrode part 52 and the second electrode part 54. The water charged to the first electrode on the accommodation part 21 through the first electrode part 52 may pass through the plurality of spraying holes 5321 of the nozzle film 532 to be sprayed to the mixing part 13 in a micro droplets from through ion evaporation and coulombic explosion generated by the second electrode of the second electrode part 54.

The structure of the electrostatic sprayer 50 may be simplified by combining the second electrode part 54 with the lower end of the connection member 55.

Figure 19:
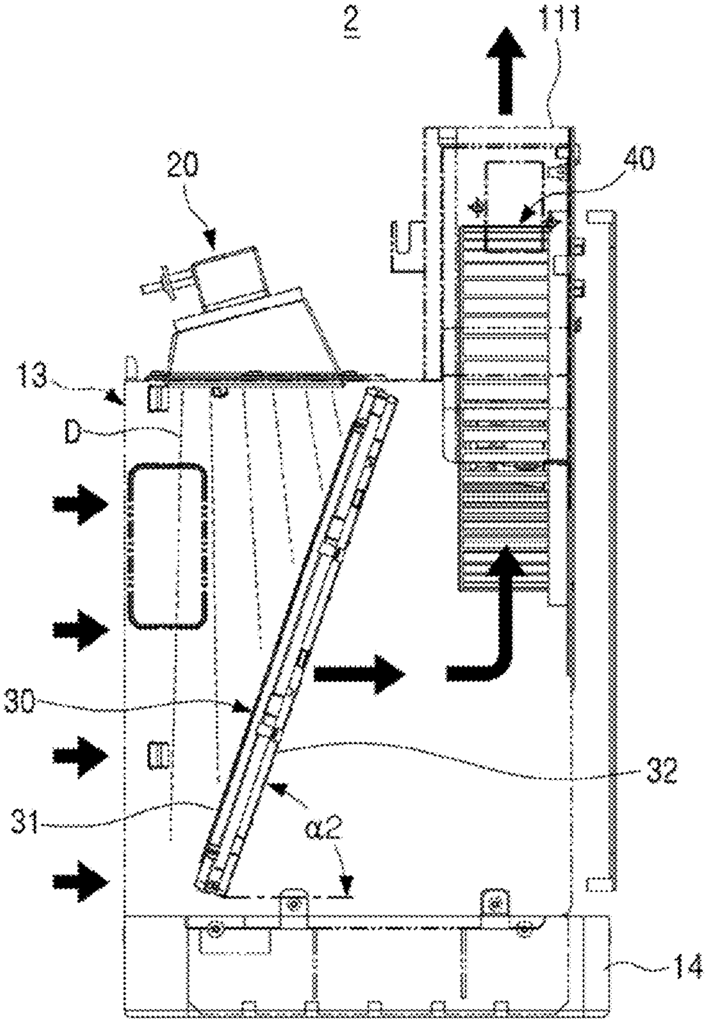
FIG. 19 is a side view illustrating the inside of an electric dust collecting device according to another embodiment.

FIG. 19 is a side view illustrating the inside of an electric dust collecting device 2 according to another embodiment.

The electric dust collecting device 2 may include a mixing part 13, a water storage 14, an electrostatic sprayer 20, a dust collecting part 30, and a discharging part 40. The configuration of the electric dust collecting device 2 according to another embodiment are the same as that of the electric dust collecting device 1 of FIG. 3.

The dust collecting part 30 of the electric dust collecting device 2 may be disposed to be inclined at a preset angle ($\alpha$2) with respect to a horizontal plane, so that the absorption part 32 may be disposed toward the horizontal plane.

The droplets D spraying to the mixing part 13 through the electrostatic sprayer 20 may be sprayed toward the charging part 31 in the mixing part 13.

The droplets D sprayed to the mixing part 13 may be directly sprayed to the dust collecting part 30, so that the dust collecting part may be cleansed by the droplets D directly sprayed to the dust collecting part 30.

The amount and speed of droplets D flowing down on the charging part 31 and the absorption part 32 may be increased by the droplets D directly sprayed to the dust collecting part 30. Therefore, the cleaning effect of the dust collecting part 30 by the droplets D may be improved.

Figure 20:
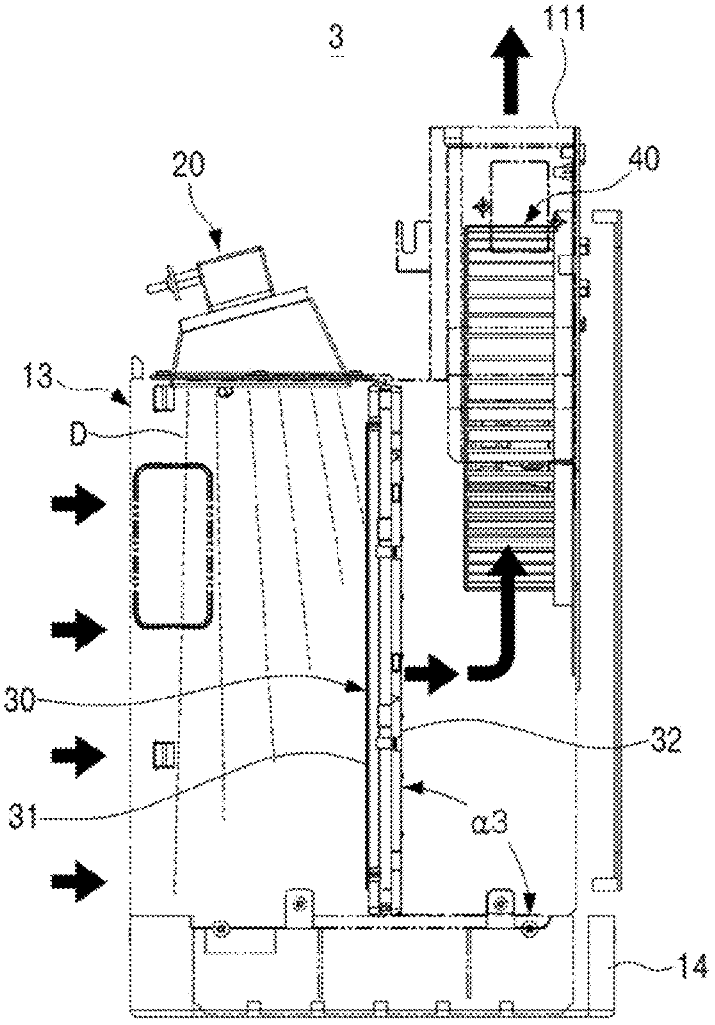
FIG. 20 is a side view illustrating the inside of an electric dust collecting device according to yet another embodiment.

FIG. 20 is a side view illustrating the inside of an electric dust collecting device according to yet another embodiment.

An electric dust collecting device 3 according to yet another embodiment may include a mixing part 13, a water storage 14, an electrostatic sprayer 20, a dust collecting part 30, and a discharging part 40, and the configuration of the electric dust collecting device 3 according to yet another embodiment may be the same or similar with those of the electric dust collecting device 1.

The dust collecting part 30 of the electric dust collecting device 3 may be disposed at a right angle ($\alpha$3) with respect to a horizontal plane.

Part of the droplets D sprayed through the electrostatic sprayer 20 may be directly sprayed to the dust collecting part 30, and then part of the remainder may be absorbed to the dust collecting part 30 after being condensed with the contaminants on the mixing part 13.

The droplets D condensed in the dust collecting part 30 may flow down or drop down in a direction perpendicular to the horizontal plane at a quick speed, and the droplets D condensed in the dust collecting part 30 may be quickly discharged to the water storage 14.

Short-circuit, tracking or leakage by the droplets D may be prevented in the dust collecting part 30.

Figure 21:
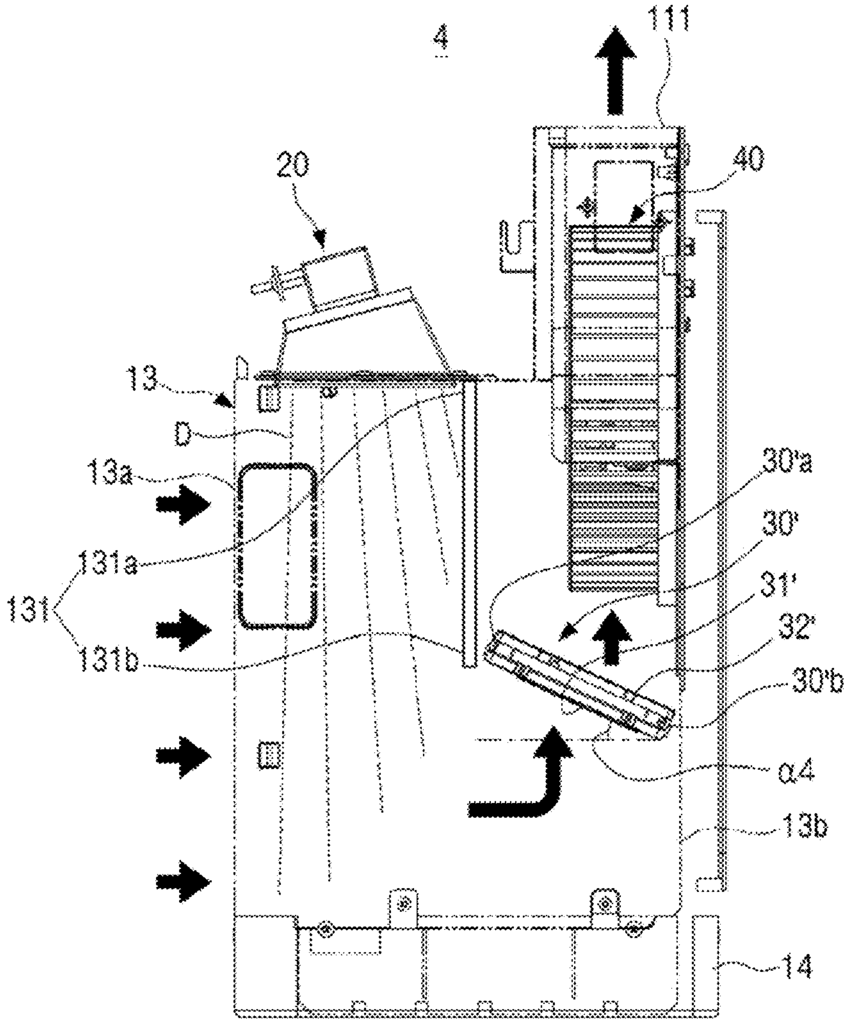
FIG. 21 is a side view illustrating the inside of an electric dust collecting device according to yet another embodiment.

FIG. 21 is a side view illustrating the inside of an electric dust collecting device according to yet another embodiment.

An electric dust collecting device 4 according to yet another embodiment may include a mixing part 13, a water storage 14, an electrostatic sprayer 20, a dust collecting part 30', and a discharging part 40, and the configuration of the electric dust collecting device 4 according to yet another embodiment may be the same or similar with those of the electric dust collecting device 1.

However, in the electric dust collecting device 4 according to yet another embodiment, the size of the dust collecting part 30' may be formed smaller than that of the dust collecting part 30 of FIG. 3 to additionally ensure a space in which the contaminants in the outside air and the droplets D could be condensed in the mixing part 13.

A lower end 30'*b* of the dust collecting part 30' may be combined to a rear surface 13*b* opposite to a front surface 13*a* of the mixing part 13 through which outside air flows, and an upper end 30'*a* of the dust collecting part 30' may be fixed in the internal space of the mixing part 13. Therefore, it is preferable that the length of the dust collecting part 30' is formed smaller than that of the dust collecting part 30 of FIG. 3.

The dust collecting part 30' may be disposed to be inclined at a preset angle ($\alpha$4) so that the charging part 31' may face the water storage 14 in the mixing part 13, and disposed to be spaced upward from the water storage 14. A space in which the contaminants and the droplets D could be condensed, which is as large as a space between the dust collecting part 30' and the water storage 14 may be additionally ensured.

The mixing part 13 may further include a blocking member 131 to prevent the droplets D directly sprayed from the electrostatic sprayer 20 from being directly sprayed to an absorption part 32'. It is preferable that the blocking member 131 is disposed behind the electrostatic sprayer 20 based on the front surface 13*a* of the mixing part 13.

The blocking member 131 may be a square-shaped plate disposed in parallel with the front surface 13*a*, including one end 131*a* combined with the upper surface of the mixing part 13, and the other end 131*b*, opposite to one end, disposed in the mixing part 13.

The upper end 30'*a* of the dust collecting part 30' may be arranged close to the other end 131*b* of the blocking member 131 to prevent the droplets sprayed from the electrostatic sprayer 20 from being directly sprayed to the absorption part 32'. Therefore, the droplets D sprayed from the electrostatic sprayer 20 to the mixing part 13 may not be directly sprayed to the dust collecting part 30', but may be condensed with the contaminants in the outside air flowing into the mixing part 13 sufficiently to be absorbed in the dust collecting part 30. Therefore, the contaminants contained in the outside air may be effectively removed.

The electric dust collecting devices 1, 2, 3, and 4 according to various embodiments of the disclosure could be air conditioners, humidifiers, and humidifying air conditioners. The electric dust collecting devices have advantages in condensing contaminants in the air through the charged micro droplets sprayed from the electrostatic sprayer 20, and absorbing the droplets in which contaminants are condensed, in the dust collecting part 30, thereby easily removing contaminants such as fine dust, bacteria, mold, and water soluble odor particles as well as dust in the air.

In addition, the droplets condensed in the dust collecting part 30 may flow down on the dust collecting part 30 to be discharged to the outside through the draining part 300, so that the contaminants absorbed in the dust collecting part 30 is automatically cleaned by the droplets. Therefore, there is no need for maintenance such as cleaning or replacing the dust collecting part 30.

Part of the droplets sprayed through the electrostatic sprayer 20 may pass through the dust collecting part 30 to be discharged through the exhaust hole 111, so that moisture may be supplied to the indoor air.

Further, the electric dust collecting devices 1, 2, 3 and 4 may control the amount of humidity discharged to the outside through the exhaust hole 111, using a controller (not shown), by adjusting the amount of droplets sprayed from the electrostatic sprayer 20, or the amount of droplets absorbed to the dust collecting part 30.

While the present disclosure has been particularly shown and described with reference to exemplary embodiments thereof, it is to be understood that the invention is not limited to the exemplary embodiments. The configuration and operation of each embodiment may be implemented in combination with at least one other embodiment.

Although exemplary embodiments have been shown and described, it will be appreciated by those skilled in the art that changes may be made to these exemplary embodiments without departing from the principles and spirit of the present disclosure. Accordingly, the scope of the present invention is not construed as being limited to the described exemplary embodiments, but is defined by the appended claims as well as equivalents thereto.

What is claimed is:

1. An electric dust collecting device, comprising:

a mixing part into which outside air flows;

an electrostatic sprayer configured to spray charged droplets into the mixing part so that the charged droplets combine with contaminants contained in the outside air;

a dust collecting part configured to form an electric field and adsorb the charged droplets combined with the contaminants; and a draining part combined with the dust collection part to discharge the charged droplets combined with the contaminants adsorbed in the dust collecting part, wherein the dust collecting part comprises:

a charging part and an absorption part oppositely combined with the charging part, and configured to absorb the charged droplets combined with the contaminants passing through the charging part, wherein the charging part comprises:

a plurality of charge wires disposed along a length direction of the charging part to allow power to be applied to an upper end part of the plurality of charge wires, and disposed in parallel to each other along a width direction of the charging part; and a plurality of ground plates disposed between the plurality of charge wires, wherein the draining part comprises:

a plurality of condensation members combined with lower end parts of the plurality of ground plates.

2. The electric dust collecting device as claimed in claim 1, wherein the charging part comprises a charging part cover for covering the plurality of charge wires and the plurality of ground plates, and wherein the charging part cover includes a plurality of draining holes being formed to face the plurality of condensation members.

3. The electric dust collecting device as claimed in claim 2, wherein the condensation members include insert grooves into which the lower end parts of the plurality of ground plates are insertable, and inclination parts for covering part of both side surfaces of ground plates and inclined downwardly toward the draining holes.

4. The electric dust collecting device as claimed in claim 1, wherein the draining part includes a first draining guide unit disposed under at least one of a upper end parts of the plurality of ground plates or the lower end parts of the plurality of ground plates, and extending along the width direction of the charging part.

5. The electric dust collecting device as claimed in claim 4, wherein the draining part includes a second draining guide unit disposed under a lower end part of the plurality of charge wires, and extending along the width direction of the charging part.

6. The electric dust collecting device as claimed in claim 5, wherein the second draining guide unit includes a draining guide part protruding outwardly from a lower end part of the charging part and inclined toward a bottom surface of the mixing part.

7. The electric dust collecting device as claimed in claim 6, wherein the charging part comprises a plurality of winding parts disposed on the lower end part of the charging part, and around which each of the plurality of charge wires are wound, and wherein the plurality of winding parts are combined on the second draining guide unit.

8. The electric dust collecting device as claimed in claim 7, wherein the winding part further comprises a draining hole disposed under a lower end part of the winding part, and opened toward the draining guide part.

9. The electric dust collecting device as claimed in claim 5, wherein the draining part comprises a third draining guide unit disposed between an upper end part of the plurality of charge wires and a charging part cover, extending along the width direction of the charging part, and having both ends of the third draining guide unit protruding to an outer side of the charging part cover.

10. The electric dust collecting device as claimed in claim 1, wherein the electrostatic sprayer comprises:

an accommodation part configured to store water;

a first electrode part configured to apply a voltage to the accommodation part;

a nozzle part combined with the accommodation part and configured to spray the charged droplets to the mixing part; and a second electrode part disposed between the nozzle part and the mixing part and to which an electrode opposite to an electrode of the first electrode part is applied.

11. The electric dust collecting device as claimed in claim 10, wherein the nozzle part comprises:

a nozzle plate combined with the accommodation part, and including an opening; and a nozzle film combined with the nozzle plate, and including a plurality of spraying holes.

12. The electric dust collecting device as claimed in claim 11, wherein the second electrode part comprises:

a frame in a ring shape including an opening in a shape corresponding to an arrangement of the plurality of spraying holes; and a plurality of second electrode wires disposed to cross the opening of the frame.

* * * * *